(12) United States Patent
Morimoto et al.

(10) Patent No.: US 6,881,954 B1
(45) Date of Patent: Apr. 19, 2005

(54) SCANNING PROBE MICROSCOPE AND METHOD OF MEASUREMENT

(75) Inventors: Takafumi Morimoto, Kashiwa (JP); Hiroshi Kuroda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 98 days.

(21) Appl. No.: 09/626,106

(22) Filed: Jul. 26, 2000

(30) Foreign Application Priority Data

Jul. 27, 1999 (JP) .......................................... 11-211418
Jul. 27, 1999 (JP) .......................................... 11-211419

(51) Int. Cl.[7] .......................... H01J 37/26; G01N 23/00
(52) U.S. Cl. ........................ 250/306; 250/307; 250/310; 250/311; 73/105
(58) Field of Search ................................ 250/306, 307, 250/310, 311, 234, 235, 423 F; 73/105; 324/260; 369/126 S; 365/101

(56) References Cited

U.S. PATENT DOCUMENTS

| | | | | |
|---|---|---|---|---|
| 5,081,353 A | * | 1/1992 | Yamada et al. | 250/306 |
| 5,103,094 A | * | 4/1992 | Hayes et al. | 250/306 |
| 5,136,162 A | * | 8/1992 | Miyamoto et al. | 250/306 |
| 5,162,653 A | * | 11/1992 | Hosaka et al. | 250/306 |
| 5,168,159 A | * | 12/1992 | Yagi | 250/306 |
| 5,173,605 A | * | 12/1992 | Hayes et al. | 250/306 |
| 5,200,617 A | * | 4/1993 | Hayes et al. | 250/306 |
| 5,245,863 A | * | 9/1993 | Kajimura et al. | 73/105 |
| 5,289,004 A | * | 2/1994 | Okada et al. | 250/306 |
| 5,336,887 A | * | 8/1994 | Yagi et al. | 250/306 |
| 5,394,741 A | * | 3/1995 | Kajimura et al. | 73/105 |
| 5,408,094 A | * | 4/1995 | Kajimura | 250/234 |
| 5,418,363 A | * | 5/1995 | Elings et al. | 250/306 |
| 5,436,448 A | * | 7/1995 | Hosaka et al. | 250/306 |
| 5,467,642 A | * | 11/1995 | Hosaka et al. | 73/105 |
| 5,656,769 A | * | 8/1997 | Nakano et al. | 73/105 |
| 5,729,015 A | * | 3/1998 | Tong | 250/306 |
| 5,811,802 A | * | 9/1998 | Gamble | 250/306 |
| 5,965,881 A | * | 10/1999 | Morimoto et al. | 250/234 |
| RE37,560 E | * | 2/2002 | Elings | 310/316.01 |

FOREIGN PATENT DOCUMENTS

JP            10062158        3/1998

* cited by examiner

*Primary Examiner*—John R. Lee
*Assistant Examiner*—Bernard E. Souw
(74) *Attorney, Agent, or Firm*—Mattingly, Stanger, Malur & Brundidge, P.C.

(57) ABSTRACT

A scanning probe microscope has an XY scanner for making a probe scan a sample surface, an approach and separate drive element for making the probe approach to the sample surface at a sampling position and separate the probe from the sample surface during movement between the sampling positions, and a servo controller for holding the distance between the probe and the sample surface at a reference distance during measurement at the sampling position. A plurality of scattered measurement locations are set away from each other as sampling positions. The approach and separation movements are performed at each sampling position. When measuring the surface by the probe at a sampling position and while making the probe move between sampling positions, servo control by the servo controller is continued. This makes it possible to quickly measure the surface by a simple controller and possible to measure a wide area or measure a high aspect ratio. When making the probe approach to the sample surface for measurement at the sampling position, it is also possible to cause a scan motion for tandem movement at an equal speed and in the same direction as the scan motion by the XY scanner.

22 Claims, 10 Drawing Sheets

SCANNING PROBE MICROSCOPE AND METHOD OF MEASUREMENT

BACKGROUND OF THE INVENTION

1. Field of the Invention

The present invention relates to a scanning probe microscope and a method of measurement capable of measuring objects with a high aspect ratio or a wide-area scanning by approaching and separating a probe to and from a sample surface while continuing a servo control for the probe in a measurement by an atomic force microscope for example. More particularly the scanning probe microscope of the present invention is useful for enlarging the field of observation for evaluation of polishing in chemical mechanical polishing (CMP) to the millimeter class, which is highly needed in the field of the production of semiconductors.

2. Description of the Related Art

Representative examples of the scanning probe microscope are atomic force microscopes, magnetic force microscopes and tunnel microscopes. An atomic force microscope is utilized for measuring the topography of the surface of a semiconductor substrate, for example, as a sample. It utilizes the atomic force acting between a probe and the surface of the semiconductor substrate to measure or observe the fine topographic features of the surface. An actuator making the probe scan the surface of the substrate is generally a piezoelectric element. The amount of displacement given by the piezoelectric element is of the micrometer ($\mu$m) class, for example, and even at the largest is about 100 $\mu$m.

(1) First Related Art (Art Relating to Reproducibility of Measurement)

In measurement using the scanning probe microscope, the practice in recent years has been to measure a wide area by a wide scanning for example. In this case, the force acting on the probe in the horizontal direction arising due to the frictional force and attraction force lowers the precision and reproducibility of measurement.

More specifically, in the production of semiconductor devices, the miniaturization of the objects being produced has led to an increasing need to evaluate the surface flatness of the semiconductor substrate or the surface flatness of films deposited on a semiconductor substrate in the process of production of the semiconductor devices. In particular, in evaluation of the flatness in a flattening process using the CMP, measurement of the topographic features of a wide range from several mm (millimeters) to tens of mm with a nanometer resolution has been desired.

As a device enabling a large field of observation in such micro-measurement, in the conventional related art, instead of the scanning probe microscope, the device disclosed in Japanese Unexamined Patent Publication (Kokai) No.10-62158 has been proposed. The device disclosed in that patent publication is a surface roughness meter. In the section on the prior art, contact type and optical type surface roughness meters are described.

A contact type surface roughness meter brings a probe member into contact with the sample surface and scans the sample surface by the probe member to measure the topographic features of the sample surface. The movement of the probe member is detected by a differential transformer type detector. An optical type surface roughness meter detects the topographic features of the sample surface by an optical displacement detection system.

A surface roughness meter is configured to be able to observe the sample surface over a wide area by a mechanical structure. As this mechanical structure, for example, a motor driven type XY stage is used for the stage for making the sample move in the XY direction. The above probe member suffers from problems due to being structured to contact the sample surface such as deformation or destruction of the sample surface or low resolution due to the mechanical contact structure.

Therefore, the above patent publication proposes to use a cantilever such as used in the atomic force microscope instead of the probe member and thereby utilize the features of the atomic force microscope for the main part of the surface roughness meter.

In the scanning probe microscope of the related art configured for micrometer class measurement, when enlarging the scan range to the millimeter (mm) range, the distance of movement of the probe at the sample surface becomes longer. According to the normal method of measurement of the related art, during that movement, the probe moves in a state with its tip extremely close to the sample surface. Therefore, various problems such as the later mentioned frictional force or attraction force arise. The frictional force or attraction force lowers the precision and reproducibility of measurement.

Further, the above Japanese Unexamined Patent Publication (Kokai) No.10-62158 argues that the surface roughness meter proposed in the Publication can reduce the contact pressure applied to the sample surface compared with the conventional surface roughness meter for the reason of using the cantilever probe of the atomic force microscope. According to the surface roughness meter proposed in that publication, the scan stroke can be made larger. Even with this surface roughness meter, however, with just use of a cantilever of an atomic force microscope, possibility of reducing the reproducibility of measurement is high, so it is difficult to solve the above problem.

In wide-area measurement of the mm class scan range by the atomic force microscope etc., for quick measurement, generally, the probe is brought into contact with the sample surface at just the positions for sampling the measurement data and the height position of the probe with respect to the sample surface is held at a reference position. Locations other than the sampling positions are designated as distances for movement. In the movement distances, the probe is moved in the state retracted and separated from the sample surface. This configuration is disclosed in Japanese Unexamined Patent Publication (Kokai) No. 2-5340, for example. In such a configuration, similarly, the problem arises of the reduction in the reproducibility of measurement due to the above problems when extending or approaching the probe to the sample surface for measurement tracking the surface.

Next the problem of the decline in the reproducibility of measurement will be explained with reference to FIG. 8 to FIG. 10. In FIG. 8 and FIG. 9, reference numeral 301 denotes a cantilever and 302 a probe attached to the tip of the cantilever 301. The cantilever 301 is drawn by two types of lines: thin solid lines and thick solid lines. The thin solid lines show the cantilever in the state before force is applied, while the thick solid lines show the cantilever in the state after force is applied. The tip of the probe 302 faces the surface of a not shown sample. The probe is approached close enough to the sample for the atomic force to act on both of them. On the back of the cantilever 301 is focused a laser beam 303 emitted from a laser light source (not shown) of a light lever type photo detection system. Further, the laser beam 303 reflected at the back of the cantilever 301 strikes for example a 4-division photodiode (not shown). At the cantilever 301, when the distance between the probe and sample is set to a predetermined value, a predetermined flex deformation occurs. When further force is applied to the probe 302 from the sample surface, the cantilever 301 undergoes further flex deformation as shown by the thick solid lines. The applied force determined the method of deformation.

FIG. 8 shows the desirable normal state of measurement. In FIG. 8, it is assumed that in the atomic force microscope only force vertical to the sample surface acts on the probe. In this state, only the displacement of the cantilever 301 due to the force acting on the sample surface in the vertical direction (Z-direction) is used as a signal source of a servo control system. When the scan of the sample surface by the probe is stopped, force does not act in the direction parallel to the sample surface due to friction, so the cantilever 301 flexes due to only the force in the vertical direction 304. As a result, the focal spot on the light receiving surface of the photodiode displaces in only the vertical direction as shown by reference numeral 305. Reference numeral 305 shows the position of the focal spot formed by the combination of a flex component and a torsion component.

On the other hand, if the probe 302 is made to scan the sample surface, frictional force occurs between the probe and sample. Due to the frictional force, force acts on the probe 302 in the direction (Y-direction) parallel to the sample due to the frictional force, so, as shown in FIG. 9, torsion occurs at the cantilever 301. Therefore, since the flex deformation and the torsion deformation components are combined, regardless of the fact that the force in the vertical direction does not change, the focal spot resulting from the reflection is made to displace in position as if there was a change due to the flex deformation. In such a case, the servo control system for the measurement drives the probe 302 in a direction to be pressed against the sample so as to try to return the focal spot on the light receiving surface of the 4-division photodiode to its original position. As a result, the problem arises that the force pressing against the probe 302 no longer becomes constant.

Further, the surface attraction force may be mentioned as a factor for force acting on the tip of the probe parallel to the sample surface. As shown in FIG. 10, in a normal atmosphere, the surface of the sample 307 is covered by adsorbed water 308. The thickness of the layer of this surface adsorbed water 308 is not constant. For example, when topographic features are formed on the sample surface, the top edge of a projection 309 becomes thinner in the thickness of the adsorbed water. The difference in thickness acts as a difference in force in a direction 310 parallel to the sample surface. Therefore, such an external disturbance acts at topographic features inherently posing a large load on the servo control system and the reproducibility of the measurement falls. Note that to facilitate the explanation, the explanation will be given about the case of scanning in a direction perpendicular to the longitudinal direction of the cantilever and the frictional force etc. causing torsional deformation. However, when scanning in any direction including a direction being consistent with the longitudinal direction of the cantilever, frictional force and other external disturbances cause the reproducibility of measurement to fall in the same way no matter what the direction.

When measuring a wide range by the atomic force microscope having a high nm class resolution, if a piezoelectric element is used as a scan actuator, the probe scan speed is about 10 $\mu$m/sec, so an extremely long time is taken. When scanning for example a range of 10 mm×10 mm and measuring the surface at 256×256 sampling positions, the measurement time becomes about 142 hours (512,000 seconds).

When using the above atomic force microscope to sample and measure a wide range of 10 mm×10 mm at 256×256 measurement points, it may be sufficient to obtain surface data once for every 40 $\mu$m. In accordance with the conventional measurement method, however, the probe was made to move so as to follow the topography of the sample surface even between measurement points for sample measurement, so the measurement efficiency was extremely poor. Therefore, to avoid this problem, the method of movement of the probe shown in the above Japanese Unexamined Patent Publication (Kokai) No. 2-5340 was proposed.

An example of the state of movement based on the configuration shown in Japanese Unexamined Patent Publication (Kokai) No. 2-5340 is shown in FIG. 11. In this figure, reference numeral 401 denotes a probe, 402 the path of movement of the probe 401, 403 a sampling position, 402a an approaching movement, 402b a separating movement, and 402c movement in the state separated from the sample surface 404. In such a configuration, since the probe 401 is made to move as shown by the movement path 402 utilizing a piezoelectric element, the speeds of movement of the approaching movement 402a and the separating movement 402b and the accuracy relating to the position become problems.

(2) Second Related Art (Art Relating to Approaching and Separating of Probe)

With the configuration of the scanning probe microscope disclosed in Japanese Unexamined Patent Publication (Kokai) No. 2-5340, the following important problem also arises.

The scanning probe microscope disclosed in this publication is a scanning tunnel microscope. The scanning tunnel microscope is provided with a servo control system. By approaching the probe to the sample surface and maintaining the tunnel current flowing between the probe and sample at a predetermined constant level, the distance between the probe and sample is held at a predetermined constant difference.

Further, since the probe is separated (or moved backward) at locations other than the sampling positions, it is necessary to suspend the control by the servo control system at the time of separating. The reason is that even if a backward signal is given to the actuator to control the height of the probe, if the above servo control is being continued, since the distance between the probe and sample will be held constant, the separating movement cannot be realized. Therefore, when moving the probe to the next sampling position and again approaching it to the sample surface, it is necessary to approach it slowly and carefully while producing an intermittently generated triangular drive signal and controlling the position in the height direction of the probe as shown by the time charts of FIG. 5 in the publication. Therefore, the problem arises that time is taken for the probe to approach to the sample. In addition, since the above approaching movement of the probe is necessary, the control of the probe movement becomes complicated.

(3) Third Related Art (Art Relating to Sample Surface with High Aspect Ratio)

Further, in the process of production of semiconductor devices in recent years, the increasing miniaturization of the objects being formed on the surface of the substrate has led to a need for a scanning probe microscope enabling observation of topographic features of a high aspect ratio. For example, holes formed for interlayer interconnections, called contact holes, have an aperture of 0.2 $\mu$m, but a depth of 1 $\mu$m. A scanning probe microscope able to measure the shape of holes with such high aspect ratios is therefore requested. The probe of the scanning probe microscope inevitably becomes a thin, long shape. For example, a probe with a high aspect ratio such as a diameter of 0.1 μm, a length of 1 μm, and a radius of the tip of 0.01 μm is used. If using such a probe for measurement by the conventional scan method of the related art, the problem arises of breakage or damage of the probe and remarkable tip wear of the probe.

SUMMARY OF THE INVENTION

The present invention has been conceived after considering the technical issues and problems explained in the above-mentioned section for the related art. In short, the present invention is proposed to solve the problems in the sample measurement by the scanning probe microscope, that is, the problems in measurement at only sampling positions by the repeated approaching and separating movement of the probe, the problems in the wide-area measurement, and the problems in measuring objects with the high aspect ratio. That is, the present invention is provided to achieve the following objects.

A first object of the present invention is to provide a scanning probe microscope configured so as to approach and separate the probe while continuing servo control and enabling measurement in a narrow area or wide area or measurement of a sample with a high aspect ratio by a high accuracy and at a high speed, and a method of measurement using the same.

A second object of the present invention is to provide a scanning probe microscope eliminating measurement error due to the effects of force acting on a probe in a direction parallel to a sample surface due to frictional force or differences in thickness of a surface adsorption layer and thereby improve the reproducibility of the measurement when the probe is approached to the sample surface and scans the sample surface, in particular one suited to wide-area measurement, and a method of measurement using the same.

A third object of the present invention is to provide a scanning probe microscope measuring topographic information of a sample surface for a wide mm class scan range by an nm or better resolution, shortening the measurement time, reducing the wear of the probe, and preventing a fall in the measurement accuracy due to the wear of the probe, and a method of measurement using the same.

A fourth object of the present invention is to provide a scanning probe microscope designed to prevent breakage, damage, and tip wear of a probe having a high aspect ratio used for measurement of topographic features including contact holes or trenches having a high aspect ratio at a surface of a substrate, and a method of measurement using the same.

To achieve the above-mentioned objects, the apparatus and methods of the present invention are configured as follows.

According to the present invention, there is first provided a scanning probe microscope provided with a cantilever having a probe close to a sample surface, an actuator (piezoelectric element) provided with the cantilever for changing a distance between the probe and the sample, a displacement detection system (light lever photo detection system) for detecting displacement of the probe, and a servo controller for outputting a control signal for controlling the operation of the actuator based on a detection signal output by the displacement detection system and a signal relating to a reference distance and holding a distance between the probe and the sample at the reference distance in measurement at a sampling position. The microscope scans the surface by the probe to measure the surface while holding the distance between the probe and the sample at the reference distance at each of a plurality of sampling positions. At the time of the measurement, the cantilever as a whole is made to approach to the sample surface. This approached state includes states of contact and non-contact. In an atomic force microscope, the probe is subjected to atomic force etc. from the sample surface and the cantilever displaces by the reference amount of flex deformation. This displacement is normally detected by a light lever photo detection system. Further, the above scanning probe microscope has an approaching and separating device which controls the operation of the actuator so as to make the probe approach to the sample surface for measurement at each of the sampling points and then make the probe separate from the sample surface. When approaching and separating it for measurement, the state of servo control by the servo controller is continued as it is.

Since the servo control by the servo controller is continued as it is when approaching and separating the probe at a sampling position, it is possible to approach the probe quickly or separate the probe reliably, so it is possible to measure the surface in a short time overall.

Preferably, the actuator may be comprised of a single piezoelectric element used for both the servo control system and the approaching and separating movement; the approach and separate device may be comprised using an approaching and separating signal supplier for outputting a periodic pulse signal for approach and separation movement; and the periodic pulse signal from the approaching and separating signal supplier may be added to the signal relating to the reference distance produced by the servo controller.

Further, preferably, further provision may be made of a displacement meter for measuring an amount of displacement due to expansion and contraction of the piezoelectric element and the displacement signal output from the displacement meter may be used as a measurement signal.

Further, preferably, the actuator may be comprised of a first piezoelectric element for normal measurement and a second piezoelectric element for approach and separation; a signal output from the servo controller may be given to the first piezoelectric element; and a periodic pulse signal for approach and separation may be given to the second piezoelectric element.

Further, preferably, when the actuator makes the probe approach to the sample surface for measurement at a sampling position, a separately provided auxiliary movement mechanism makes the probe move in tandem at an equal speed in the same direction as the scan motion due to the movement mechanism.

Further, preferably, further provision may be made of a movement mechanism for making the probe scan the sample surface over a wide area and, when the probe scans the sample based on the operation of the movement mechanism and the second piezoelectric element makes the probe approach to the sample surface for measurement at a sampling position, the first piezoelectric element makes the probe move in tandem at an equal speed in the same direction as the scan motion due to the movement mechanism. The first piezoelectric element functions as an auxiliary movement mechanism.

Further, preferably, the probe may have a high aspect ratio, and the probe may measure a surface with a high aspect ratio. For example, when measuring contact holes or other topographic features with a high aspect ratio formed on the surface of a semiconductor substrate, a thin, long probe with a high aspect ratio is used. In such a case, even if measuring a narrow range, breakage of the probe or other problems may occur, so the scanning probe microscope according to the present invention having the above configuration is used.

The method of measurement of the scanning probe microscope according to the present invention is performed by the scanning probe microscope having any of the above configurations. The method of measurement scans the surface by a probe to measure the surface while holding the distance between the probe and sample at a reference distance at each of a plurality of sampling positions. This method of measurement includes the step of making the probe approach to the sample to obtain measurement data at each of the sampling points, and after making the probe separate from the sample, while continuing the state of servo control of the distance between the probe and the sample by the servo controller.

Preferably, the above method of measurement of a scanning probe microscope may further comprise adding a signal used for approach and separation to a signal relating to a reference distance in a control loop of the servo controller.

Further, preferably, the actuator may be comprised of a first piezoelectric element for normal measurement and a second piezoelectric element for approach and separation; a signal output from the servo controller may be given to the first piezoelectric element; and a periodic pulse signal for extension and retraction may be given to the second piezoelectric element.

Further, preferably, when the actuator makes the probe approach to the sample surface for measurement at a sampling position, a separately provided auxiliary movement mechanism may make the probe move in tandem at an equal speed in the same direction as the scan motion by the movement mechanism.

According to the method of measurement according to the present invention, by this wide measurement and use of a probe with a high aspect ratio, topographic features with a high aspect ratio on a semiconductor substrate etc. can be measured.

According to the method of measurement of the scanning probe microscope of the present invention, when performing wide measurement while approaching and separating the probe at a sampling position, by continuing servo control of the distance between the sample and probe based on the servo controller, the probe can be approached and separated by simple control in a short time.

Another scanning probe microscope of the present invention is configured as a microscope for wide measurement. The scanning probe microscope for wide measurement is provided with a movement mechanism (XY scanner) for making the probe scan the sample surface over a wide area, an approaching and separating device (for example, an approach and separation piezoelectric element and its drive) for making the probe approach to the sample surface at the sampling position and making the probe separate from the sample surface during movement between sampling positions, and an auxiliary movement mechanism (for example, an XY direction find movement part built in the piezoelectric element) for making the probe move in tandem at an equal speed in the same direction as the scan motion of the movement mechanism when making the probe approach to the sample surface for measurement at a sampling position. The movement mechanism is a main scanner causing scan motion by a large stroke at the time of measurement. The auxiliary movement mechanism is a sub scanner for causing tandem movement so as not to cause a relative speed difference between the probe and sample surface at the time of scan motion and thereby avoid a force in a direction parallel to the sample surface, which is undesirable in measurement, from being applied to the probe.

The scanning probe microscope for wide measurement of the present invention is configured to select and set scattered measurement locations in a wide range as sampling positions, move the probe from the sample surface in the retracted state at the time of movement between sampling positions, and approach the probe to the sample surface for measurement only at the sampling positions for measurement. Movement of the probe in the height direction vertical to the sample surface includes the approach and separation and tracking the sample surface for measurement. When scanning the measurement area, the probe is approached to the sample and measures by tracking the sample surface each time a sampling position is reached. At this time, an auxiliary movement mechanism is provided for causing sub scan motion such as tandem movement at the probe side with respect to the main scan motion by the movement mechanism. Due to this, it is possible to prevent a force parallel to the sample surface (horizontal direction etc.) due to the frictional force or surface adsorption layer etc. from affecting the probe and thereby possible to measure with a good reproducibility.

Preferably, the movement mechanism may be a sample stage for carrying the sample and making the sample move in for example the horizontal direction or other scan direction in millimeter units of length. Further, the movement by the movement mechanism may be performed at an equal speed.

The method of scanning in the scanning probe microscope for wide measurement of the present invention provides a probe close to a sample surface and scans the sample surface with the probe to measure topographic features etc. of the surface while holding the distance between the probe and sample at a predetermined distance based on control of a servo control system. In this method of scanning, the measurement area at the sample surface is relatively wide, a plurality of scattered sampling positions are set in the wide measurement area, and, when performing scan motion by a movement mechanism, the probe is separated from the sample surface and moved during movement between sampling points. Further, the probe is approached to the sample surface for measurement at each sampling point. When approaching the probe to the sample surface for measurement, the auxiliary movement mechanism causes scan motion for tandem movement at a substantially equal speed in the same direction as the scan motion by the movement mechanism. Further, in this method of scanning, when making the probe approach to the sample surface by a predetermined distance and make the probe track the sample surface to measure the topography etc. of the sample surface, by making the probe also move at substantially the same speed as the scan motion due to movement of the sample, force in the direction along the sample surface is prevented from acting on the probe.

In the above method of scanning, the tandem movement scan motion is performed intermittently for each sampling position. At a measurement location, that is, sampling position, the probe is made to approach to the sample surface to an extent subject to atomic force etc., so the above tandem movement scan motion is performed each time. Further, a reverse scan motion may be performed each time the tandem movement scan motion ends.

Another scanning probe microscope of the present invention provides with the above configuration plus a movement mechanism (XY scanner) for making the probe scan the sample surface over a wide area, a piezoelectric element for making the probe displace in a height direction of the sample with respect to the surface, a reference distance setter for giving a voltage signal determining the reference distance, an approach and separation signal supplier for giving a voltage signal for making the probe approach to and separate from the sample surface, an adder for combining a voltage signal determining the reference distance and the approach and separation voltage signal, and a subtractor for calculating a difference between a voltage signal output by the adder and the detection signal to output a differential signal. The servo control circuit generates a control voltage signal based on the differential signal and supplies the voltage signal to a piezoelectric element to control the expansion and contraction.

The above scanning probe microscope for example makes the sample move at a large mm class movement stroke, makes the probe close to the sample surface at just sampling positions for the measurement, and makes the probe separate from the sample surface and move during movement between sampling positions. Due to this, a wide range can be moved across at a high speed, measurement becomes possible in a short time, and the contact with the sample surface is reduced so as to reduce the wear of the probe. In particular, it is possible to perform the displacement of the probe with respect to the sample surface in the height direction, that is, the approach and separation movement, and the holding of the reference distance between the probe and sample at the time of measurement by a single piezoelectric element by superposing the approach and separate signal on a signal setting the reference distance in a servo control loop.

Preferably, the approach and separation voltage signal output by the approach and separation signal supplier may be a periodically generated pulse signal. Further, preferably the movement mechanism may be a sample stage for carrying the sample and making the sample move in for example a direction horizontal to the sample surface, for example, the horizontal direction, in millimeter units of length.

Further, preferably, the above scanning probe microscope may be provided with a drive for the approach and separation different from the servo piezoelectric element for making the probe track the sample surface when the probe is approached to the sample surface and held at a predetermined reference distance. The drive approaches and separates the probe at a sampling position, measures the surface in the approached state, and moves the probe between sampling positions in the separated state. At this time, servo control by the servo control system is continued for the servo piezoelectric element. If a piezoelectric element is used as the approach and separation drive, the drive can be simply configured as a two-stage structure together with the servo piezoelectric element.

The above scanning probe microscope as well is not limited in application to wide measurement. It may of course also be applied to the case of measurement using a probe having for example a high aspect ratio even in ordinary narrow measurement.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Preferred embodiments of the present invention will be explained below with reference to the attached drawings. The present invention, however, is not limited to these embodiments.

In the following explanation of the preferred embodiments, first embodiments relating to the extension and retraction of a probe will be explained.

Figure 1:
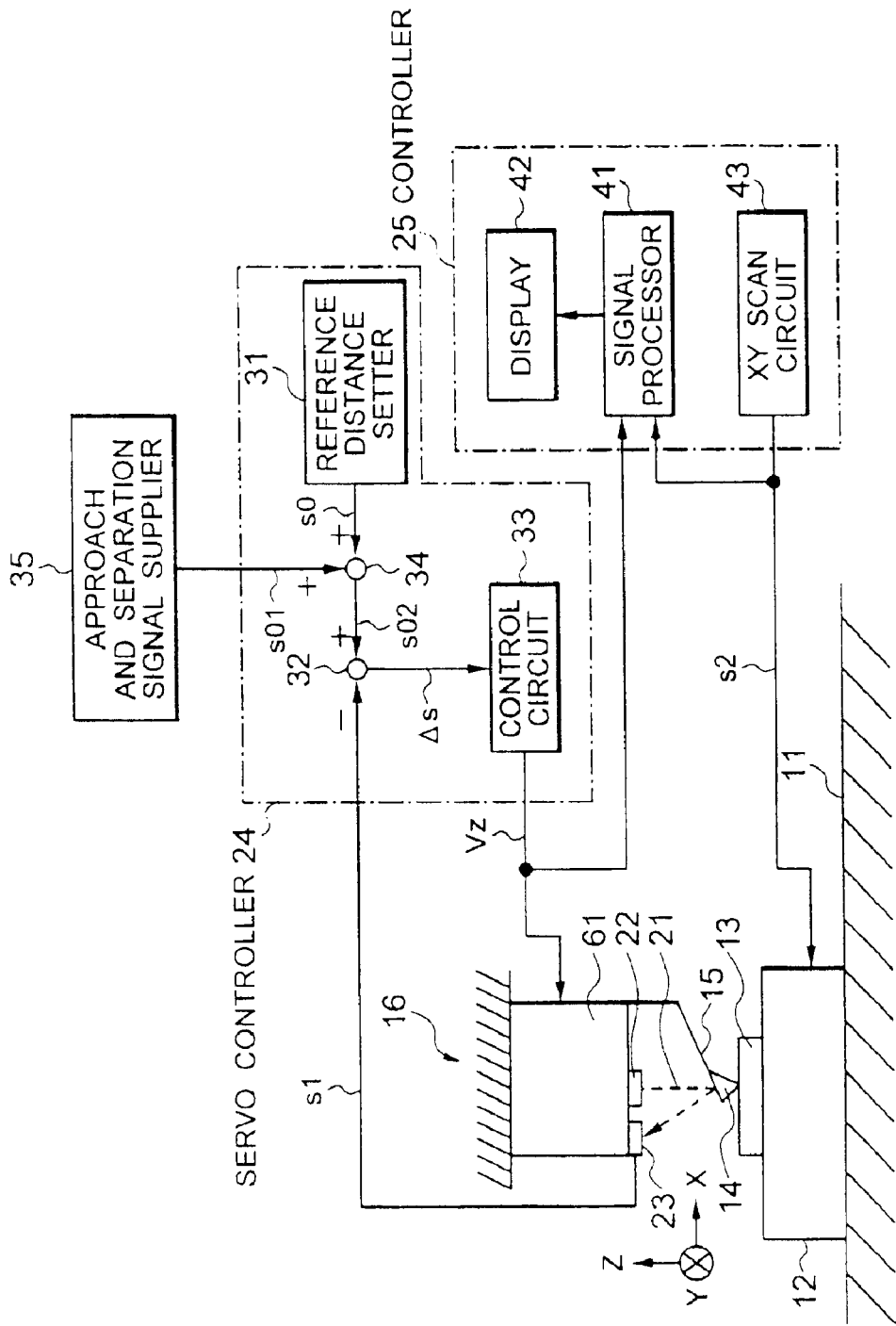
FIG. 1 is a view of the configuration of the overall system of a scanning probe microscope according to a first embodiment of the present invention.
Figure 2:
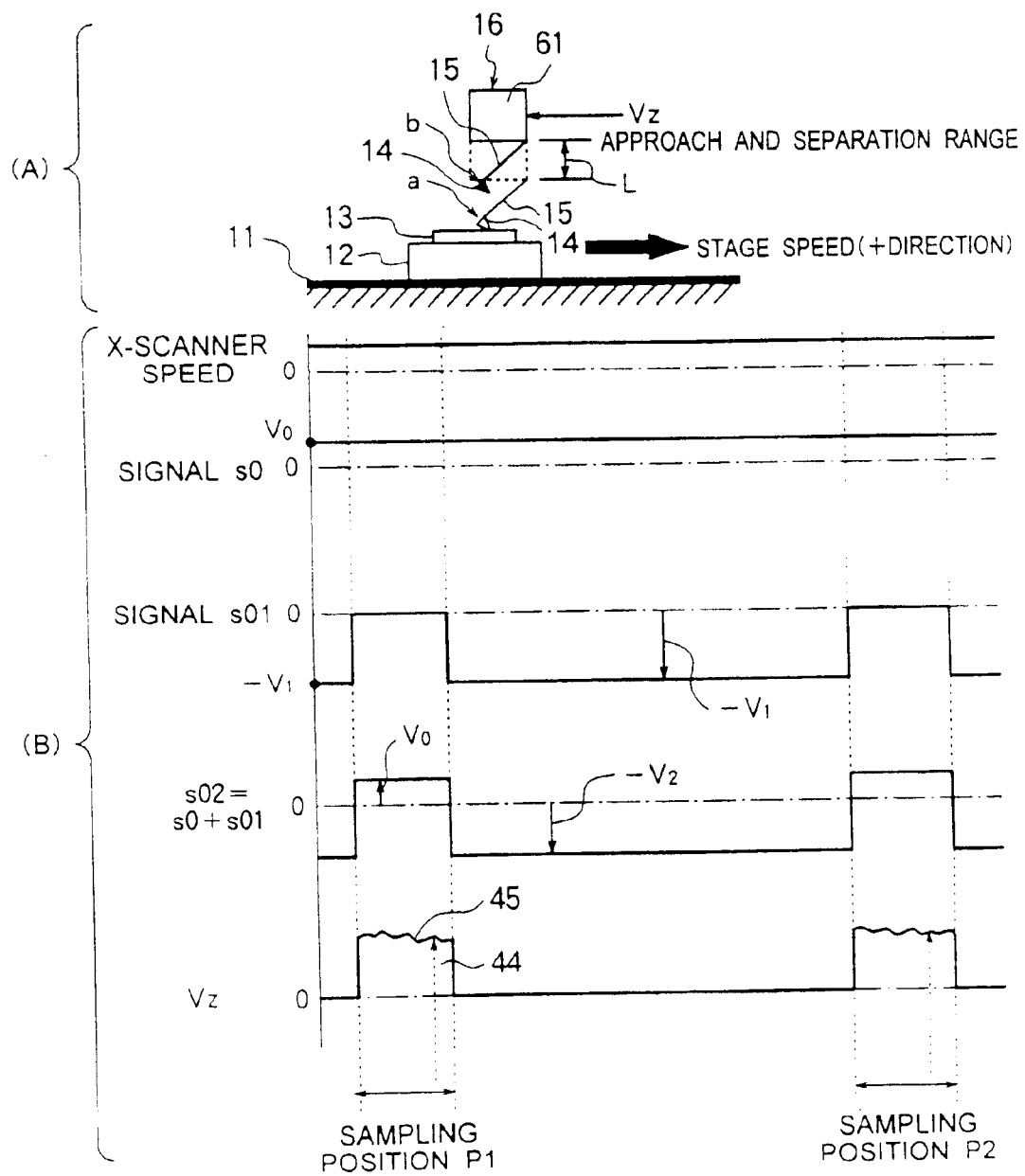
FIG. 2 is a view explaining an approaching and separating movement (method of measurement) at the time of measurement by the scanning probe microscope according to the first embodiment.

A first embodiment of a scanning probe microscope according to the present invention will be explained with reference to FIGS. 1 and 2. FIG. 1 shows the configuration of the overall system of an atomic force microscope as a representative example of the scanning probe microscope. FIG. 2 shows the method of control of the positional change of the probe relating to approaching and separating movement, a timing chart, a waveform chart of voltage signals of parts at the time of probe movement in the X-direction and Z-direction, and the probe position in the height direction in the case of observing a specific area by the atomic force microscope while scanning the sample surface by the probe. The change in the position of the probe is caused by the scan of the probe in the XY directions along the sample surface and the movement in the height direction (Z-direction) for adjusting the distance between the sample and probe. Note that the X-direction, Y-direction, and Z-direction, as shown in FIG. 1, are the directions of the orthogonal X-, Y-, and Z-axes.

The overall system configuration, as shown in FIG. 1, comprises an XY scanner 12 arranged on a table 11 held horizontally and an object for observation, that is, a sample 13, arranged on the same. The XY scanner 12 houses a drive enabling movement in the X-direction and a drive enabling movement in the Y-direction. In FIG. 1, the surface parallel to the surface of the table 11 is for example a horizontal surface. The two orthogonal X- and Y-axes define an XY plane. The sample 13 is a thin plate-shaped member such as a semiconductor wafer. The sample 13 is arranged on the XY scanner 12 with the surface for observation facing up.

The XY scanner 12 is a movement mechanism for making the sample 13 move in the X-direction or Y-direction. The XY scanner 12 used is a narrow area movement mechanism or a wide area movement mechanism. A narrow area movement mechanism is used as the XY scanner 12 in the case of narrow measurement, while a wide area movement mechanism is used in the case of wide area movement. A narrow area movement mechanism is for example comprised utilizing a piezoelectric element. A wide area movement mechanism is for example comprised utilizing a pulse motor etc. The wide area movement mechanism makes the sample 13 move by a relatively large distance by a movement stroke of tens of mm in mm (millimeter) units.

A cantilever 15 formed with a probe 14 on its tip is arranged at a position above the sample 13 for the purpose of observing the top surface of the sample 13 carried on the XY scanner 12. The tip of the probe 13 is close to the surface of the sample 13.

In the above-mentioned configuration, by making the sample 13 move by the XY scanner 12, the probe 14 close to the sample 13 scans it in a range in which the sample surface is set in a relative positional relationship with it, so measures a specific area in the set range.

The cantilever 15 is fixed at its base end and is free at the front end where the probe 14 is provided. The cantilever 15 is an elastic lever member having a small spring constant. The cantilever 15 undergoes flex deformation in accordance with force received when an atomic force occurs between the probe 14 at the front end and the sample 13. Reference numeral 16 is a Z-direction drive. The Z-direction drive 16 has the cantilever 15 attached to its bottom end. The Z-direction drive 16 makes the cantilever 15 move in the direction vertical (Z-direction) to the horizontal plane in FIG. 1. The Z-direction drive 16 is comprised of a single piezoelectric element 61.

The piezoelectric element 61 is an approaching and separating piezoelectric element for making the entire cantilever 15 including the probe 14 approach to the surface of the sample 13 and making it separate from the surface. The piezoelectric element 61 makes the probe 14 approach and separate when measuring and observing the surface at a sampling point for obtaining measurement data. Further, the piezoelectric element 61 makes the probe 14 track the topography of the sample surface at a sampling position. The piezoelectric element 61 is comprised of a monoaxial piezoelectric element generating displacement in the Z-direction. The piezoelectric element 61 used is a tubular piezoelectric fine movement element, for example. The piezoelectric element 61 is comprised of a servo piezoelectric element for holding the height position of the probe 14 with respect to the sample surface at a predetermined position. At the time of the approach, separation, and measurement, it is controlled in operation under the servo control system.

The Z-direction drive 16 is actually fixed to a microscope frame.

In the above configuration, in the state with the probe 14 brought close, with a certain spacing, to the surface of the sample 13 carried on the XY scanner 12, the sample is made to move in the XY directions by the XY scanner 12 by a set stroke while adjusting the height position of the cantilever 15, that is, the probe 14, with respect to the sample surface by the piezoelectric element 61 of the Z-direction drive 16 for measurement based on a scan range set in the sample surface. In the Z-direction drive 16 for adjusting the height position of the probe 14 with respect to the sample surface, the piezoelectric element 61 is an actuator for making the probe 14 (cantilever 15) approach to or separate from the sample surface by a predetermined distance at each of a plurality of sampling positions set in a measurement area of the sample surface. At this time, the piezoelectric element 61 is maintained in a state with continuing servo control in the state of approach and separation at the sampling positions. Therefore, when measuring the surface of the sample 13, at a sampling position, the probe 14 is made to approach by the piezoelectric element 61 to track the surface and obtain the measurement data relating to the topographic features of the sample surface, then the probe is made to separate by the piezoelectric element 61 for movement to the next sampling position. The movement of the probe 14 from one sampling position to another sampling position is performed in a state separated from the sample surface by the separation movement. The distance from the sample surface is set being dependent on the difference of the surface unevenness or the existence of the absorbed water etc., on the surface of the sample 13.

In the above, each X- and Y-stroke of the XY scanner 12 is set for normal measurement. The stroke of the piezoelectric element 61 is suitably set to enable this approaching and separating movement. The approaching and separating actuator is preferably a piezoelectric element which expands and contracts by a long stroke as explained above, but the invention is not limited to this.

The cantilever 15 arranged above the sample 13 is provided with a detection system for detecting the height position of the probe 14 with respect to the sample surface (Z-direction displacement). The detection system is a light lever type photo detection system comprised using the flex deformation of the cantilever 15 and a laser beam. The light lever type photo detection system is comprised of a laser light source 22 for focusing a laser beam 21 on a reflection surface formed on the back of the cantilever and a 4-division photodiode 23 for example receiving the laser beam 21 reflected at the back. The laser light source 22 and photodiode 23 are for example provided at the bottom of the piezoelectric element 61 and operate together along with the operation of the piezoelectric element 61. The reflected spot of the laser beam 21 reflected at the back of the cantilever 15 strikes the 4-division light receiving surface of the photodiode 23. If the distance between the probe and the sample changes in the state where the probe receives the atomic force from the sample surface, the atomic force received by the probe will change, the height position of the probe 14 will displace, and the amount of flex deformation of the cantilever 15 will change. The reflected spot of the laser beam 21 at the light receiving surface of the photodiode 23 displaces from the center position in accordance with the amount of change of the amount of flex deformation of the cantilever 15, so the height position of the probe 14 (cantilever 15) with respect to the sample surface is adjusted by the later mentioned servo control system so that the distance between the probe and sample is held at a set constant reference distance. Due to this, the position of the reflected spot of the laser beam 21 at the light receiving surface of the photodiode 23 is held at the above center position in accordance with the set constant distance between the probe and sample.

Next, the control system will be explained. The control system is comprised of a servo controller 24 and a controller 25. FIG. 1 shows an example of the internal structure of the servo controller 24 and controller 25.

The servo controller 24 is comprised of a reference distance setter 31 for outputting a signal s0 for setting a reference distance, a subtractor 32 for calculating a difference Δs between a signal s1 and signal s02, and a control circuit 33 for outputting a control signal Vz based on the difference Δs. The servo controller 24 is further provided with an adder 34 and an approach and separation signal supplier 35 since the Z-direction drive 16 is configured by a single piezoelectric element 61. In the servo controller 24, the adder 34 adds (combines) the voltage signal s0 relating to the reference distance output from the reference distance setter 31 and the approach and separation voltage signal S01 output from the approach and separation signal supplier 35 to output the voltage signal s02. Further, the subtractor 32, as explained above, finds the difference between the input detection signal s1 and the voltage signal s02 output from the adder 34. The control circuit 33 outputs a control voltage signal Vz for making the piezoelectric element 61 operate so that the differential signal Δs output from the subtractor 32 becomes 0. The above approach and separation voltage signal s01 is a periodically output pulse signal. The voltage signal s02 output from the adder 34 is the sum of the voltage signal s0 and the voltage signal s01 for the approach and separation movement. The control voltage signal Vz output from the control circuit 33 is supplied to the piezoelectric element 61.

The controller 25 is provided with a signal processor 41, display 42, and XY scan circuit 43. The controller 25 is a host controller. The controller 25 includes the signal processor 41 as explained above. Further, the signal processor 41 has a built-in storage and is provided with an input portion etc. The controller 25, including the signal processor 41, is for example comprised of a personal computer. The display 42 is a cathode ray tube (CRT) or other display. The signal processor 41 receives as input the control voltage signal Vz output from the control circuit 33 of the servo controller 32. The XY scan circuit 43 gives a scan control signal s2 to the XY scanner 12 for making the sample 13 move in the XY direction so as to make the probe 14 scan the sample surface. The scan data for making the sample 13 move is generated by the XY scan circuit 32 in the controller 25, output to the XY scanner 12 as the scan control signal s2, and simultaneously stored in the storage in the signal processor 41. Therefore, the storage in the signal processor 41 in the controller 25 stores the measurement area of the surface of the sample 13 as scan data relating to the scan range. The controller 25 combines the above scan data relating to the measurement area (positional data of sampling position) and the voltage signal Vz supplied to the piezoelectric element 61 at each sampling position (height data with respect to surface of sample 13) to produce image data relating to the topographic features of the measurement area to be observed in the sample 13 and display the image obtained by the measurement on the display screen of the display 42.

In the above configuration, when measurement is started by the supply of the voltage signal Vz from the servo controller 24 to the piezoelectric element 61 and the supply of the signal s2 from the controller 25 to the XY scanner 12, the servo control system is constantly maintained in the active state and servo control relating to the expansion and contraction of the piezoelectric element 61 is continued at the time of movement between sampling positions and at the time of measurement at a sampling position.

Here, "servo control . . . is continued" means the state where the servo controller 24 is maintained in the active state at least while the measurement is being performed and control is performed so that the amount of flex deformation of the cantilever 15 (or amount of displacement of the probe) is detected by the above-mentioned light lever type photo detection system comprised of the laser light source 22 and the photodiode 23 and the distance between the probe 14 and the surface of the sample 13 is held at a specific distance set at the time of measurement (reference distance set by the reference distance setter 31). When the approach and separation signal supplier 35 outputs an approach signal, a feedback voltage signal (Vz) is given to the piezoelectric element 61 and the distance between the probe 14 and the surface of the sample 13 is held at the specific distance. When the approach and separation signal supplier 35 outputs a separation signal, basically the distance between the probe and sample tries to be held at a specific distance by the action of the light lever type photo detection system and the servo controller 24, but since the separation signal is added, the piezoelectric element 61 is held in a contracted state for realizing the predetermined retracted state by the separation signal.

Referring to FIG. 2, an explanation will be given next of the measurement based on the configuration shown in FIG. 1. In FIG. 2, (A) shows the state of the approach and separation movement based on the piezoelectric element 61 with respect to the sample 13, while (B) shows a timing chart. In the atomic force microscope of this embodiment, the piezoelectric element 61 expands and contracts by the supplied voltage Vz. At a sampling position, due to the approach signal component of the approach and separation signal s01, the piezoelectric element 61 expands by a large amount as shown by the broken lines and makes the probe 14 (cantilever 15) approach to the surface of the sample 13 to press the probe 14 against it (state a). In that state, under the servo control by the servo control system, the probe tracks the sample surface to measure the topography of the surface. Next, due to the separation signal component of the approach and separation signal s01, the piezoelectric element 61 contracts by a large amount as shown by the solid lines to make the probe 14 separate from the surface of the sample 13 (state b) and then is moved to the next sampling position.

In FIG. 2, the timing chart of (B) shows from the top row the speed in the X-direction due to the X-scanner component included in the XY scanner 12, the signal s0 setting the reference distance, the approach and separation signal s01, the sum s02 of the signal s0 and the signal s01, and the state of change of the voltage Vz. When the probe 14 is made to approach to the surface of the sample 13, the signal s0 setting the distance between the probe and sample is constantly maintained at a preset value (voltage value $V_0 > 0$). In measurement by the atomic force microscope, according to the measurement by this embodiment, the servo control is kept constantly on and therefore the servo control continued. The signal s0 is set to a positive constant voltage, so if the probe is actually made to approach to the sample surface, the probe is pressed against the sample surface. The force pressing the probe against the sample surface is determined by the voltage value $V_0$ of the signal s0. At the sampling positions P1 and P2, the approach and separation voltage signal s01 output from the approach and separation signal supplier 35 becomes 0 and the voltage signal s02 output from the adder 23 is s0. Therefore, at each sampling position, the surface is measured by tracking the sample surface in the same way as the case in the conventional atomic force microscope of the related art. After the measurement at the sampling position P1 ends, the next sampling position P2 is moved to, but at this time $-V_1$ is output from the approach and separation signal supplier 35. This voltage value is a negative voltage with an absolute value larger than the above voltage $V_0$. Therefore, the voltage signal s02 output from the adder 34 (=s0+s01) becomes $-V_2$ (=$V_0-V_1$). As a result, the force pressing the probe against the sample surface is set to a negative pressing force, that is, a pulling force. The servo control is continued as explained above and in constant effect, so when the pressing force becomes negative, the probe 14 is made to separate from the sample surface. In actuality, it is not possible to control the force to a negative force exceeding the surface tension, so the probe completely retracts and the servo control by the servo control system is held in that state. Therefore, the probe moves from the sampling position P1 to the next sampling position P2 in the state separated from the sample surface. When reaching the sampling position P2, the output of the approach and separation signal supplier 35 becomes a certain period 0. During that time, the voltage signal s02 output from the adder 34 becomes $V_0$, the piezoelectric element 61 expands by a large amount, the probe 14 is pushed against the surface of the sample 13, and the surface is measured by tracking the surface. Note that the control voltage Vz supplied to the piezoelectric element 61 controls the expansion and contraction of the piezoelectric element 61 so that the probe tracks the sample surface due to the continuous action of the servo control system as explained above in the state with the probe 14 approached to the surface of the sample 13, so, as shown in (B) of FIG. 2, the signal 45 of the topography of the sample surface is superposed on the pulse-shaped voltage 44.

As explained above, when observing the surface in a specific measurement area of the surface of the sample 13, it is made possible to set a plurality of sampling positions for measurement, approach and separate the probe to and from the sample surface at the sampling positions for measurement, and make the probe approach and separate while continuing the servo control. In the feedback control loop of the servo control system, the voltage signal s02 determining the position of the probe 14 is produced by generating a periodic pulse signal as the approach and separation voltage signal s01 and superposing it on the signal s0 indicating the reference distance. This enables the approach and separation movement of the probe while continuing the servo control at each of the plurality of sampling positions. Due to this, the above-mentioned narrow measurement or wide measurement is performed. The above configuration enables wide measurement quickly. Further, as mentioned later, this is good when measuring objects with a high aspect ratio using a probe with a high aspect ratio.

Figure 3:
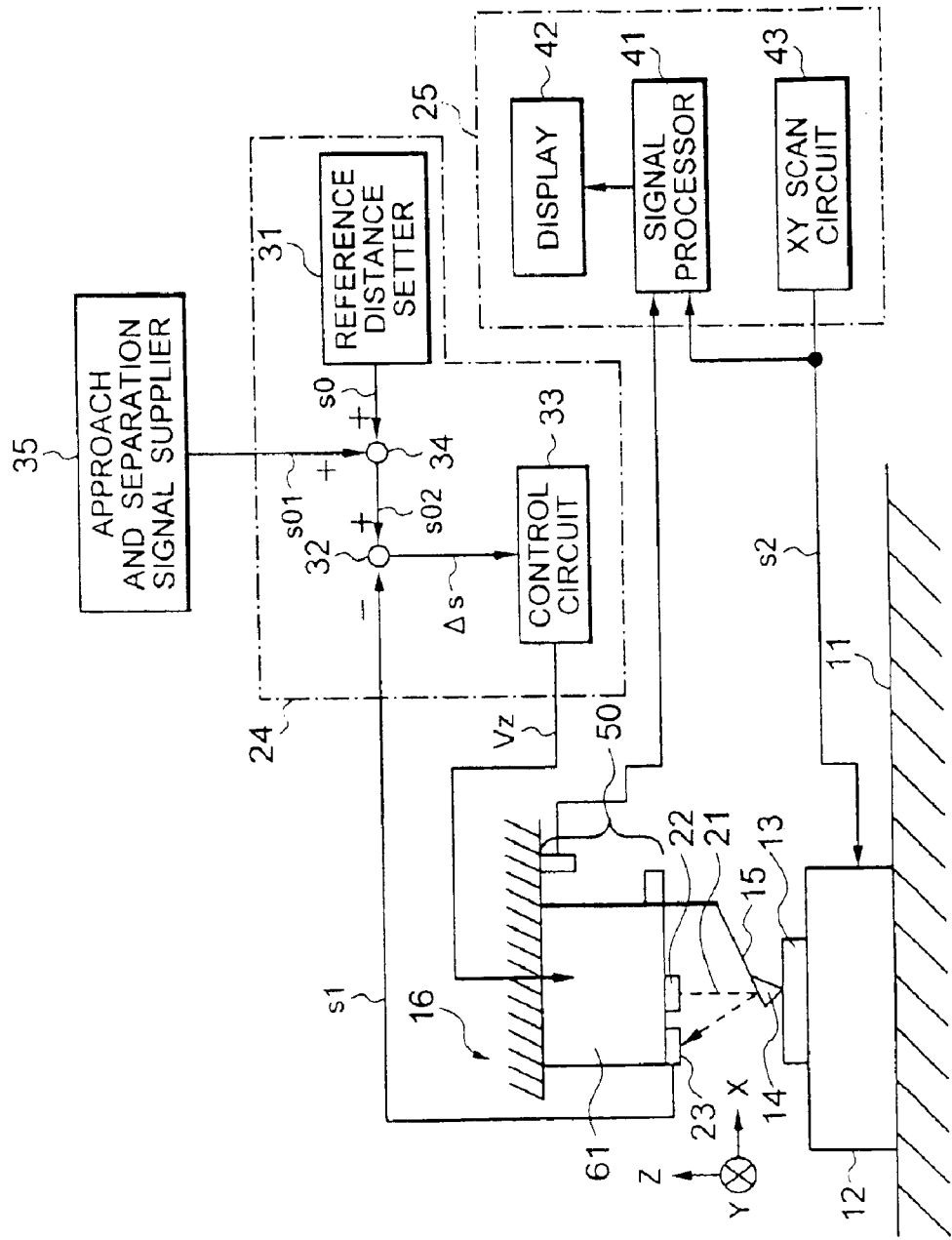
FIG. 3 is a view of the configuration of the overall system of a scanning probe microscope according to a second embodiment of the present invention.

Next, an explanation will be given of a second embodiment of the present invention with reference to FIG. 3. In the second embodiment as well, like the first embodiment, the probe is made to approach and separate while continuing the servo control by the servo controller 24 in the measurement at the sampling positions in the measurement area of the surface of the sample 13. FIG. 3 is a view similar to FIG. 1. In FIG. 3, elements substantially the same as the elements shown in FIG. 1 are assigned the same reference numerals and detailed explanations thereof will be omitted. The characterizing feature of this embodiment is that the control voltage signal Vz output from the control circuit 33 is not used as the measurement data relating to the topography of the sample surface. Instead, a displacement meter 50 for detecting the displacement is separately provided for the piezoelectric element 61 of the Z-direction drive 16 and the displacement signal output by that displacement meter 50 is used. Various devices can be used as the displacement meter 50. The displacement signal output from the displacement meter 50 is input to the signal processor 41. Further, in the configuration of the first embodiment, the voltage signal Vz was used, but it was necessary to obtain a signal 45 of the topography of the sample surface from the voltage signal Vz. In the case of the second embodiment, however, by utilizing the displacement meter 50, it becomes possible to directly obtain a signal of the topography of the sample surface. The rest of the configuration, that is, the approach and separation movement and measurement at the sampling positions in the measurement area while continuing servo control, the signal processing, and the preparation and display of the image, is substantially the same as that explained in the above first embodiment.

Next, an explanation will be given of a third embodiment of the present invention with reference to FIGS. 4 and 5. In the third embodiment, the Z-direction drive 16 is comprised by two piezoelectric elements. The Z-direction drive 16 of the second embodiment differs from that of the third embodiment in configuration and operation. Further, the servo controller 24 is not provided with the above-mentioned approach and separation signal supplier 35 and adder 36. The voltage signal s0 output from the reference distance setter 31 is directly input to the subtractor 32. In the third embodiment shown in FIGS. 4, (A) and (B) of FIG. 5, elements substantially the same as the elements explained in the first embodiment are assigned the same reference numerals.

In the third embodiment, the Z-direction drive 16 is comprised of two piezoelectric elements 51, 52. The lower piezoelectric element 51 is a servo piezoelectric element engaged in the movement of the probe in the Z-direction. The piezoelectric element 51 is used as only a servo piezoelectric element for tracking the surface at the time of measurement. The upper piezoelectric element 52 is a piezoelectric element involved in only the approach and separation of the probe.

Figure 4:
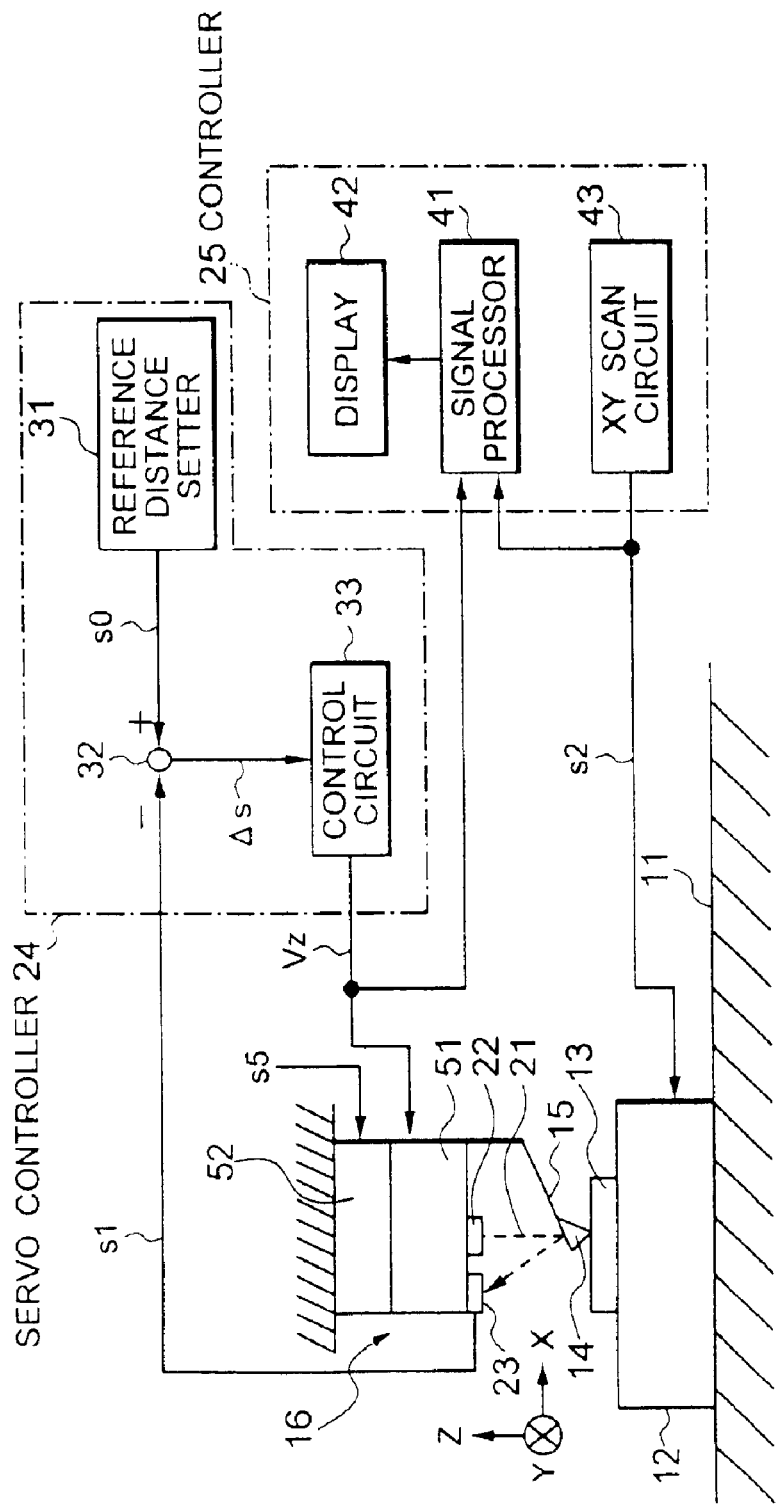
FIG. 4 is a view of the configuration of the overall system of a scanning probe microscope according to a third embodiment of the present invention.

As shown in FIG. 4, in the third embodiment as well, the internal configurations of the servo controller 24 and the controller 25 are shown. The servo controller 24 is comprised of the reference distance setter 31 outputting the signal s0 for setting the reference distance, the subtractor 32 for calculating the difference Δs of the signal s1 and signal s0, and the control circuit 33 outputting the control signal Vz based on the difference Δs. Further, the controller 25 is provided with a signal processor 41, display 42, and XY scan circuit 43. The approach and separation movement of the probe at the sampling position are realized by the expansion and contraction of the piezoelectric element 52 based on the approach and separation signal s5. The approach and separation signal s5 is a periodically generated pulse signal. The approach and separation signal s5 is given from any signal supplier. For example, the approach and separation signal s5 may be given from the above-mentioned separately provided approach and separation signal supplier 35 or may be given from a signal processor 41 of the host controller 25.

Figure 5:
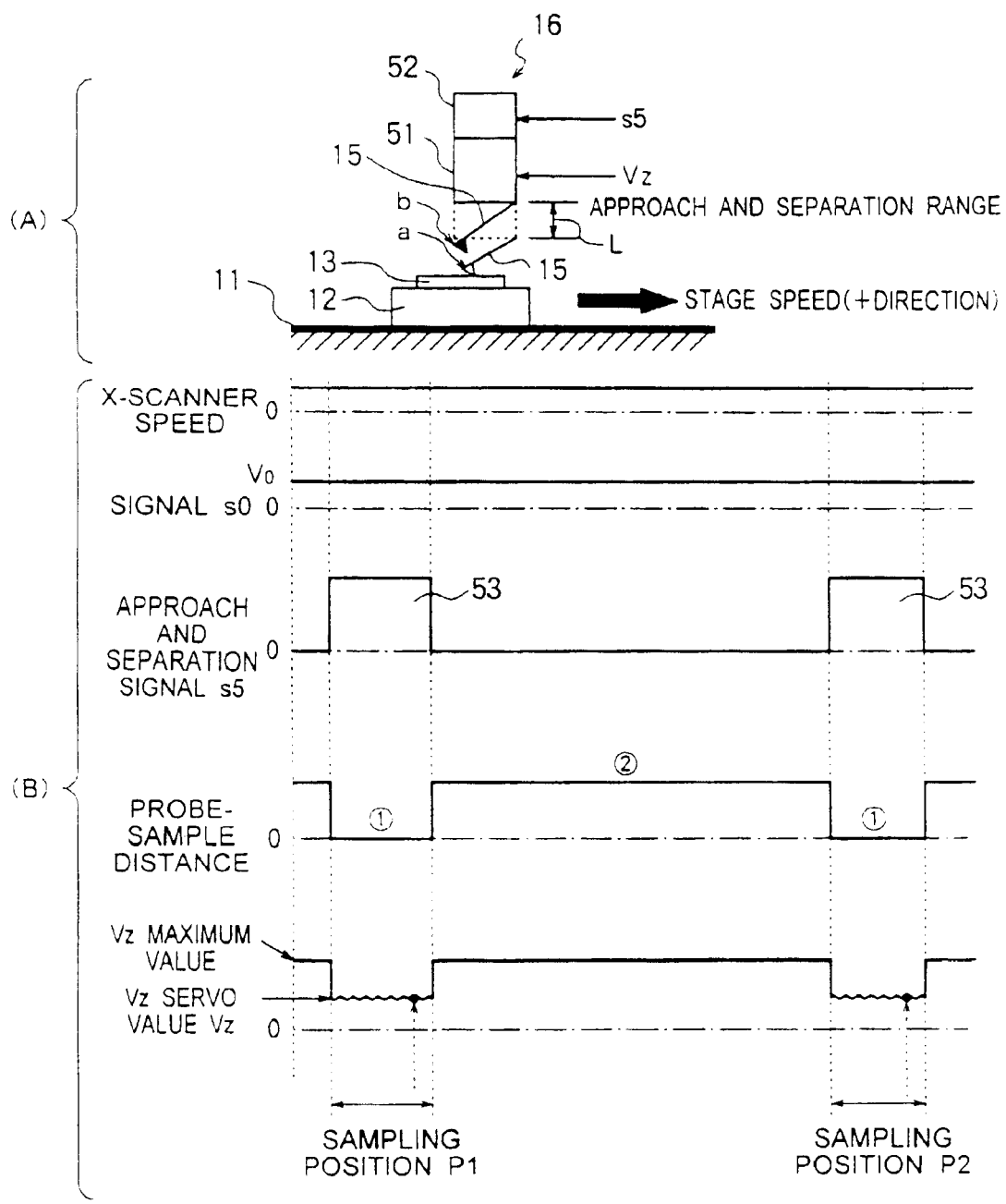
FIG. 5 is a view explaining the extension and retraction (method of measurement) at the time of measurement by the scanning probe microscope according to the third embodiment.

FIG. 5 is a view corresponding to the above-mentioned FIG. 2. In FIG. 5, (A) shows the two states (a, b) of the approach and separation by the piezoelectric element 52 with respect to the sample 13, while (B) shows a timing chart. The timing chart of (B) in FIG. 5 shows an example of measurement at the sampling positions P1 and P2 similar to the first embodiment. The timing chart of (B) shows from the top row the speed in the X-direction due to the X-scanner component included in the XY scanner 12, the signal s0 setting the reference distance, the approach and separation signal s5, the distance between the probe and the sample, and the state of change of the voltage Vz. The horizontal axis in the timing chart of (B) in FIG. 5 corresponds to the direction of movement, that is, the X-direction. The distance between the probe and sample becomes substantially 0 when a positive pulse voltage 53 is being generated by the signal s5 (section ① shown in FIG. 5) and is made a constant distance of the retracted state when a positive pulse voltage 53 is not being generated (section ② shown in FIG. 5). Regarding the voltage Vz supplied to the servo piezoelectric element 51, in the section ① corresponding to the sampling positions (P1, P2), the probe is approached to the sample surface and tracks the sample surface, so Vz becomes the servo control value. On the other hand, in the section ① for movement, the probe moves in a state separated from the sample surface, the piezoelectric element 51 expands by its maximum stroke trying to make the distance between the probe and sample the reference distance, and Vz becomes the maximum value. The servo control value of Vz at one point in the section ① of the sampling positions P1 and P2 is obtained as the measurement data. The expansion and contraction of the piezoelectric element 52 for the approach and separation movement can be performed at the two ends of the maximum position and minimum position in the drive range of the piezoelectric element 52, or can be performed between two points of any one position and another position in the drive range.

According to the above-mentioned configuration, using the approach and separation piezoelectric element 52 provided separately and independently from the servo piezoelectric element 51 for the measurement, it becomes possible to make the probe 14 approach to and separate from the surface of the sample 13 at the sampling positions. Due to this configuration, for example, wide measurement is possible while achieving the action and effect explained in the above first embodiment. In this embodiment as well, in the control for measurement, the servo control system is constantly held at an active state. The servo control is continued for the operation of the piezoelectric element 51 during measurement.

Next, an explanation will be given of a fourth embodiment of the scanning probe microscope according to the present invention with reference to FIGS. 6 and 7. This embodiment is predicated on wide measurement by a wide scan and involves a tandem movement when the probe is approached to the sample surface at the sampling positions.

Figure 6:
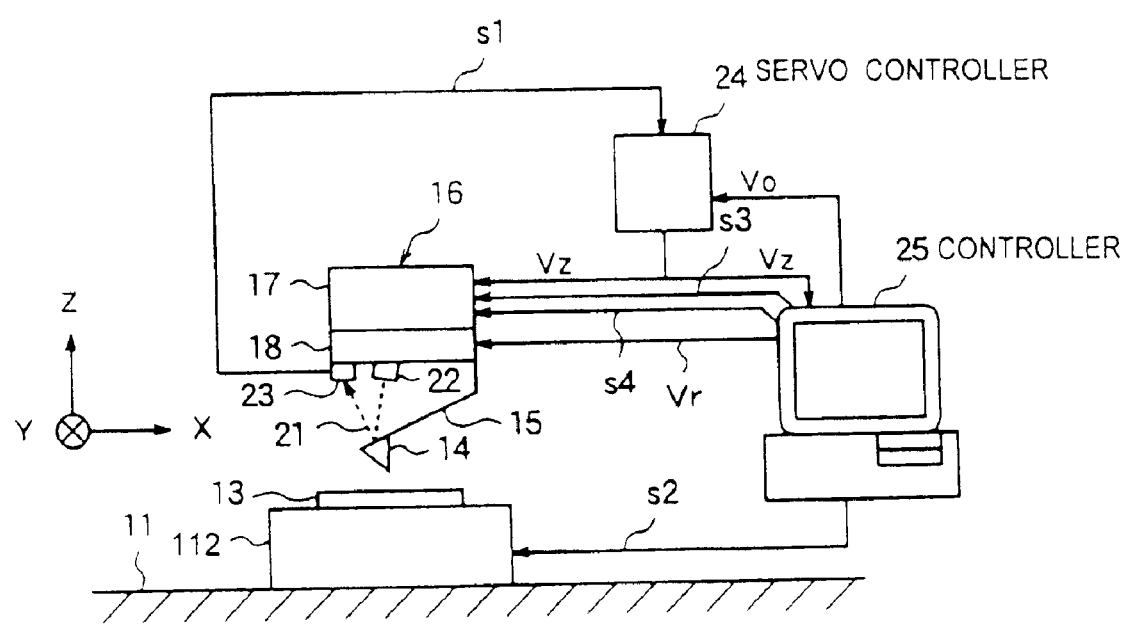
FIG. 6 is a schematic view of the configuration of the overall system of a scanning probe microscope according to a fourth embodiment of the present invention.
Figure 8:
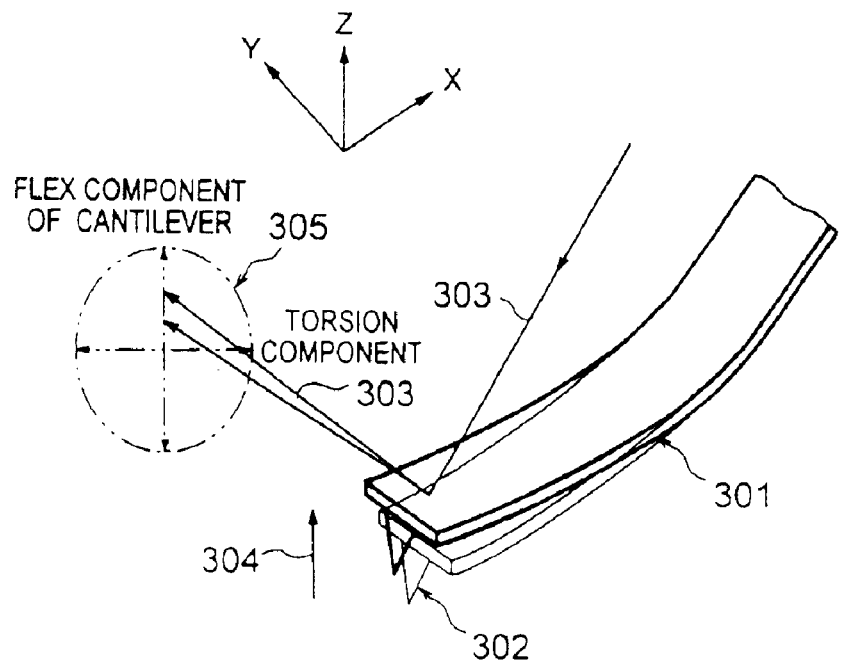
FIG. 8 is a view explaining the inherent flex deformation of a cantilever used in an atomic force microscope.
Figure 9:
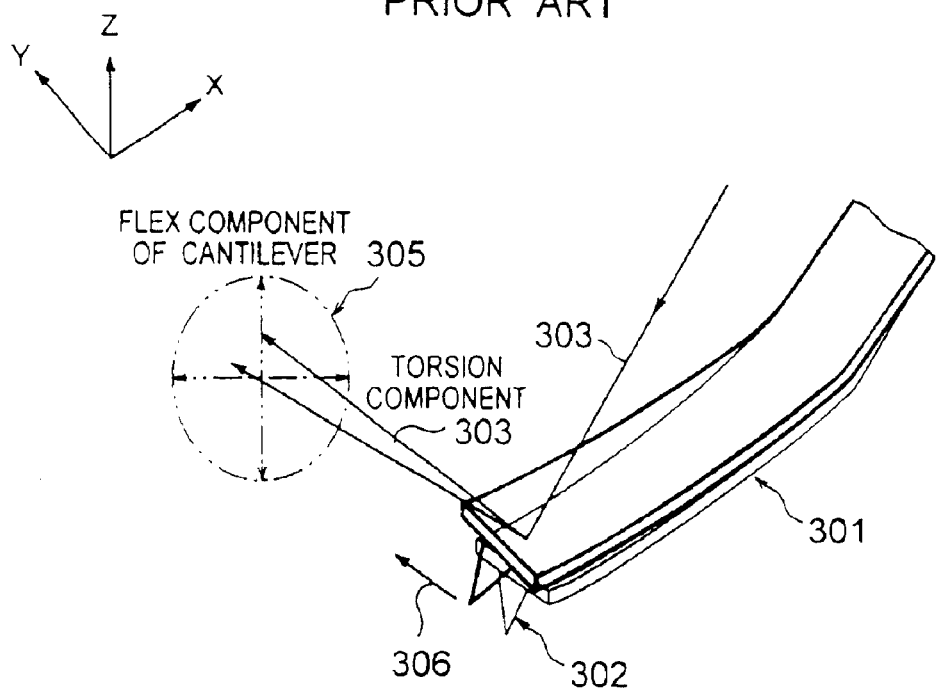
FIG. 9 is a view explaining the problem of flex deformation of a cantilever when a force parallel to the sample surface is applied to the probe.
Figure 10:
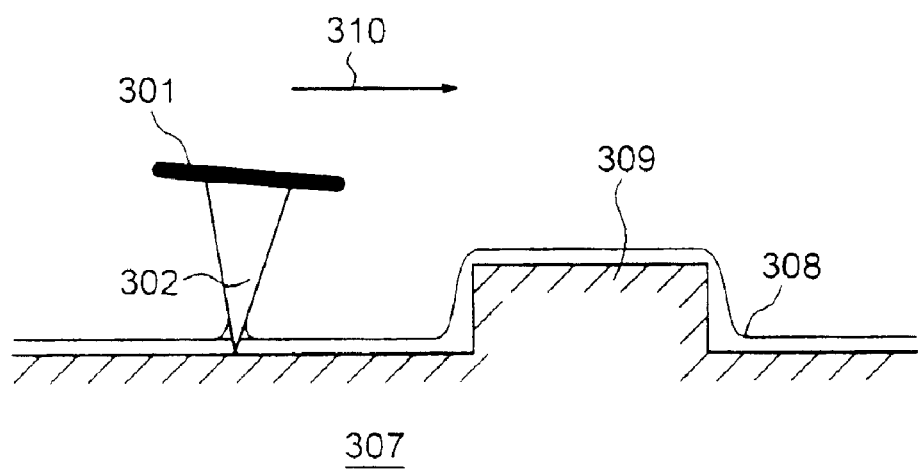
FIG. 10 is a view explaining the problem when the probe is affected by the surface adsorption layer.
Figure 11:
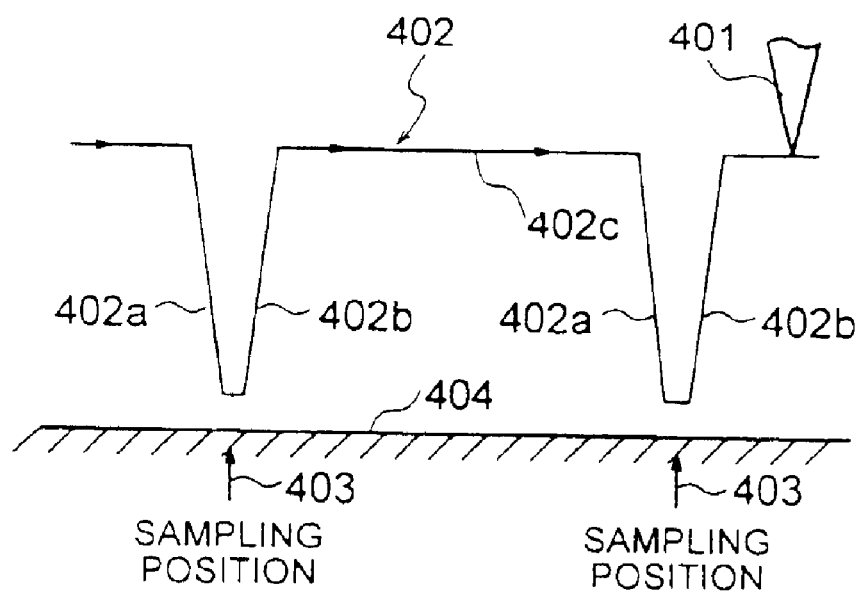
FIG. 11 is a view explaining movement of the probe when making wide-area measurement by a probe approaching and separating movement.

FIG. 6 shows the overall system configuration of an atomic force microscope similar to the above as an example of a scanning probe microscope. In FIG. 6, the internal configurations of the servo controller 24 and controller 25 are not shown, but are similar to those of the previous embodiment. FIG. 8 is a timing chart of the relationship of speed for explaining the tandem movement of the probe in the X-direction. The change in the position of the probe is caused by the scan of the probe in the XY direction along the sample surface and the movement in the height direction (Z-direction) for adjusting the distance between the sample and probe. The X-direction, Y-direction, and Z-direction are the directions of the three orthogonal X-, Y-, and Z-axes, as shown in FIG. 6.

An XY scanner 112 is arranged on the table 11, while the object of observation, that is, a sample 13, is arranged on top of this. The sample 13, such as a semiconductor wafer, is arranged on the XY scanner 112 with the surface for observation facing upward. In this embodiment, the XY scanner 112 is the movement mechanism for making the sample 13 move by a relatively large distance in each of the X- and Y-directions. The XY scanner 112 functions as a main scanner. The XY scanner 112 is for example comprised as a sample stage for movement made using a pulse motor etc. According to the XY scanner 112, it is for example possible to set a stroke of tens of mm. The cantilever 15 formed with the probe 14 at its front end is arranged at a position above the sample 13 for the purpose of observing the top surface of the sample 13 carried on the XY scanner 112. The tip of the probe 13 is close to the surface of the sample 13. In the above configuration, by making the sample 13 move by the XY scanner 112, the probe 13 close to the sample 13 scans the sample surface over a wide range through the change in relative position, so it becomes possible to measure a wide area by a wide scan.

The cantilever 15 is attached to the bottom end of the Z-direction drive 16. In the present embodiment, the Z-direction drive 16 is comprised of two piezoelectric elements 17, 18 arranged above and below each other.

The piezoelectric element 17 is a piezoelectric element used for normal measurement and observation. The piezoelectric element 17 is comprised of a triaxial piezoelectric element causing displacement in the three X-, Y-, and Z-directions. The piezoelectric element 17 used is the conventional tubular piezoelectric fine movement element or tripod-type piezoelectric fine movement element and the like. The portion related to the fine movement of the piezoelectric element 17 in the Z-direction (Z-direction find movement part) is comprised of a servo piezoelectric element for holding the height position of the probe 14 from the sample surface at a set constant reference position. The Z-direction find movement part is controlled in operation by the servo control system at the time of measurement. The portion relating to fine movement in the XY directions by the piezoelectric element 17 (XY direction find movement part) comprises the later mentioned sub scanner for scanning motion for tandem movement.

The piezoelectric element 18 is an approach and separation piezoelectric element for making the probe 14, that is, the cantilever 15 as a whole, approach to the surface of the sample 13 and separate from the surface.

As explained above, the Z-direction drive 16 for making the cantilever 15 (or probe 14) move in the Z-direction is formed by a two-stage structure comprised of two piezoelectric elements 17, 18. Preferably, the Z-direction drive 16 is formed by a single piezoelectric element. This is divided into two to form the piezoelectric elements 17, 18.

Further, the Z-direction drive 16 is structured provided with the approach and separation piezoelectric element 18 below the piezoelectric element 17, but it is also possible to reverse the mounting structure and provide the piezoelectric element 17 below the approach and section piezoelectric element 18.

According to the above-mentioned configuration, the probe 14 is positioned close, by a certain space, to the surface of the sample 13 carried on the XY scanner 12. In this state, by adjusting the height direction of the cantilever 15, that is, the probe 14, from the sample surface by the piezoelectric elements 17, 18 of the Z-direction drive 16 while making the sample 13 move by a relatively large stroke by the XY scanner 12, wide measurement can be performed by a mm class scan range over the sample surface.

The Z-direction drive 16 for adjusting the height position of the probe 14 from the sample surface is an actuator for making the probe 14 (or cantilever 15) approach to the sample surface up by a predetermined distance or making it retract from the sample surface at each of a plurality of sampling positions set at constant intervals in the wide measurement area of the sample surface. The piezoelectric element 17 is an actuator for obtaining measurement data of the sample surface along the topographic features of the surface based on servo control and tandem movement for normal measurement and observation in an extended state at the sampling positions. Therefore, when measuring the surface of the sample 13 by a wide scan, the probe 14 is made to approach only at the sampling positions by the piezoelectric element 18. The surface tracking and acquisition of the measurement data relating to the topographic features of the sample surface while performing the tandem movement using the piezoelectric element 17 or the movement of the probe 14 from one sampling position to another sampling position are performed in a state with the probe separated from the sample surface due to the piezoelectric element 18.

In the above, the X- and Y-strokes of the XY scanner 12 are for example a maximum of 200 mm. The stroke of the piezoelectric element 17 is for example 10 $\mu$m in the X- and Y-directions and 5 $\mu$m in the Z-direction. The stroke of the piezoelectric element 18 is suitably set so as to give the above-mentioned approach and separation movement. The approach and separation actuator, as explained above, is preferably a piezoelectric element 18 expanding and contracting by a long stroke, but the invention is not limited to this. Further, it is possible not to configure the Z-direction drive 16 at the probe side by two stages and not to provide the approach and separation piezoelectric element 18, but instead to provide the approach and separation drive at the stage at the sample side. In this case, the above XY scanner is configured as a triaxial scanner able to move in the Z-direction as well.

The cantilever 15 is provided with a detection system for detecting the height position of the probe 14 from the sample surface (displacement in Z-direction). The detection system used is a light lever type photo detection system as explained in the previous embodiment.

As the control system, the above-mentioned servo controller 24 and host controller 25 are provided.

The servo controller 24 controls the expansion and contraction of the piezoelectric element 17 in the Z-direction. The servo controller 24 receives as input the detection signal s1 representing the distance between the probe and sample output from the photodiode 23. The servo controller 24 has the same configuration as that shown in FIG. 4. That is, the servo controller 24 includes a reference distance setter outputting a signal showing a set constant reference distance, a subtractor outputting the difference between the signal and the input detection signal s1, and a control circuit outputting a control voltage signal Vz for making the Z-direction find movement part of the piezoelectric element 17 operate so that the differential signal output from the subtractor becomes zero. The piezoelectric element 18 makes the cantilever 15 move so that the probe is approached to the sample 13 to an extent where an atomic force acts between the probe and sample. In this state, a servo control feedback loop is formed by the above light lever type photo detection system, the servo controller 24, and the Z-direction fine movement part of the piezoelectric element 17. Due to the servo control loop, the amount of flex deformation of the cantilever 15 is held constant and the distance between the probe and sample is held at the set reference distance.

The controller 25 is comprised of a personal computer provided with a signal processor, display, XY scan circuit, input device, etc. The controller 25 gives information on the reference distance set in the servo controller 24 by the voltage signal $V_0$ and receives as input the control voltage signal Vz given from the servo controller 24 to the Z-direction fine movement part. Further, a scan control signal s2 for controlling the operation is given from the XY scan circuit built in the controller 25 to the XY scanner 112. The storage of the controller 25 stores the measurement area at the surface of the sample 13 as the scan range data. In the case of the present embodiment, wide measurement is performed by a mm (millimeter) class wide scan by making the XY scanner 112 operate. The controller 25 combines the above scan data (positional data of the sampling position) relating to the measurement area and the voltage signal Vz supplied to the servo piezoelectric element 17 at the sampling positions (height data from surface of sample 13) so as to prepare the image data relating to the topographic features of the observed surface of the sample 13 and displays the observed image on the screen of the display.

The controller 25 has a built-in XY scan circuit for sub scanning for the tandem movement. A scan signal s4 is given from the XY scan circuit to the XY direction fine movement part of the piezoelectric element 17.

Further, the controller 25 outputs a control voltage signal Vr to the approach and separation piezoelectric element 18 of the Z-direction drive 16 so as to make it expand for the approach and to make it contract for the separation. The voltage signal Vr is given to the piezoelectric element 18 only at the sampling positions in the measurement area of the sample surface. The piezoelectric element 18 expands and contracts for the approach and separation movement of the probe 14 at the sampling positions. When the probe 14 moves between sampling positions, the probe 14 (cantilever 15 as a whole) is made to retract and moved in a state separated from the surface of the sample 13. The positional information of sampling positions in the measurement area of the surface of the sample 13 is provided in advance in the controller 25. Further, the amount of the expansion for the extension of the piezoelectric element 18 and the amount of contraction for the separation are set in advance at the controller 25 side.

Next, referring to FIG. 7, an explanation will be given of the tandem movement at the time of measurement with reference to the approach and separation movement, and measurement of the probe of the atomic force microscope. In FIG. 7, (A) is a view of the configuration, while (B) is a timing chart of the scan motion by the XY scanner 112 and the scan motion of the XY direction fine movement part of the piezoelectric element 17. The timing chart of (B) shows the speed of the sub scan of the XY direction fine movement part (sub scanner) of the piezoelectric element 17, the speed of the main scan of the XY scanner (main scanner) 112, the relative speed between the probe and sample based on these speeds, and the height H of the probe from the sample surface.

At the sampling position P1, the XY scanner 112 makes the sample 13 move for example in the X-direction at a constant speed (equal speed) for motion for the main scan under the control of the controller 25. At the sampling position P1, when the probe 14 starts approaching to the surface of the sample 13, the controller 25 simultaneously controls the operation of the XY direction fine movement part of the piezoelectric element 17 by the scan signal s4. In particular, in this case, for fine movement in the X-direction, it starts movement at an equal speed as the speed of movement in the X-direction by the XY scanner 112. As a result, in a section 131 where the probe 14 approaches to the sample surface for the measurement (height data sampling), the probe 13 moves in tandem with the movement of the sample 13 and the relative speed of the probe 14 with respect to the sample 13 becomes substantially 0. In the section 131, the sample surface is tracked as explained above and height information in the Z-direction is read using the servo control signal of the piezoelectric element 17 in the state ③, that is, the voltage Vz. The stroke for the sub scan determining the section 131 is for example about 10 µm. When the measurement ends and the section 131 ends (state ④), as explained above, the probe 14 is made to separate from the sample surface, but at this time the controller 25 simultaneously makes the XY direction fine movement part of the piezoelectric element 17 operate for reverse movement. A section 132 shows the distance of reverse movement. After the end of the reverse movement (state ⑥), in a section 133, the XY direction fine movement part of the piezoelectric element 17 is held in the stopped stage. When the next sampling position P2 arrives, the above tandem movement and reverse movements are repeated. In this way, each time one of the large number of sampling positions arrives, tandem movement giving a relative speed of 0 is intermittently repeated. As explained above, since tandem movement is performed at the time of sampling, it is possible to prevent a force parallel to the sample surface from acting on the probe while the probe is approaching to and separating from the sample surface. Therefore, servo control is possible with just Z-direction displacement of the probe (cantilever), the reproducibility of the measurement is improved, and the reliability of measurement is improved. Further, when measuring the sample surface by a probe, it is possible to measure the surface without stopping equal speed movement of the sample stage, that is, the XY scanner 112, so the throughput of the measurement can be improved.

In the above embodiments, the probe 14 was made to move in reverse after tandem movement of the probe when making the probe 14 extend to the sample surface at the sampling position, but reverse movement at each sampling position is not necessarily essential. For example, if moving in tandem at the time of approaching at the sampling positions in measurement at a scan in the plus (+) direction at a scan line in the X-direction such as shown in FIG. 7, stopping the auxiliary movement mechanism at the time of separating, repeating the tandem movement only when the probe approaches to the next sampling position, and measuring the surface until the last of the scan lines in the X-direction, then changing the scan line to the next scan line (predetermined amount of feed in the Y-direction), scanning to the minus (−) side in the X-direction, and tandem movement to the minus side of the X-direction (side opposite to that previously) at the time of extension at the sampling positions, reverse movement at the sampling positions for returning the probe position to the original predetermined position becomes unnecessary.

In the above embodiments, an XY direction fine movement part of the piezoelectric element 17 was utilized as an auxiliary movement mechanism for causing scan motion for tandem movement at the same equal speed and in the same direction as the scan motion by the XY scanner when making the probe approach to the sample surface for the measurement at the sampling positions, but it is of course also possible to provide an auxiliary movement mechanism of a separate configuration as the piezoelectric element 17.

Figure 7:
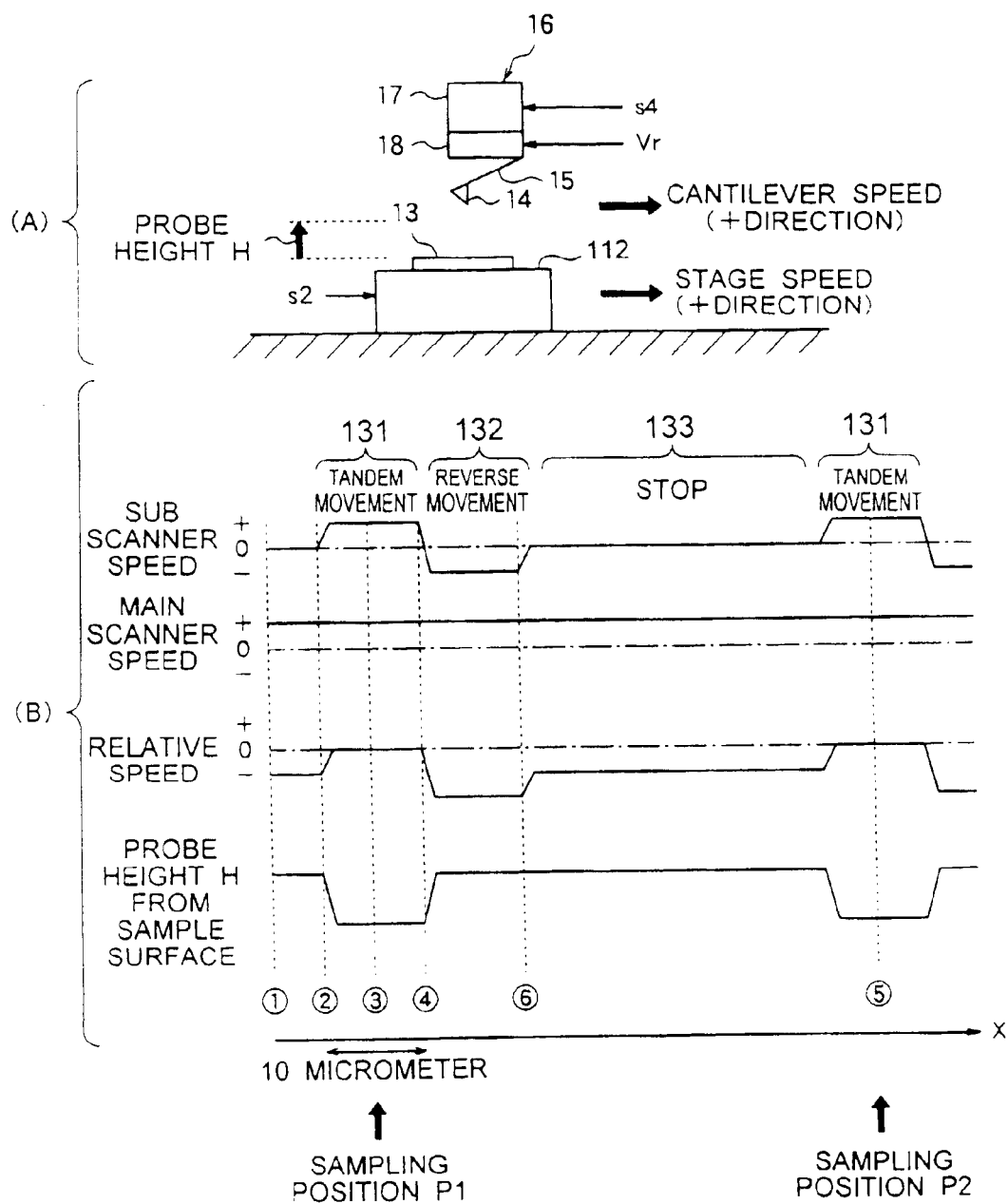
FIG. 7 is a view explaining the scan of a tandem movement at the time of measurement based on the scanning probe microscope according to the fourth embodiment.

In the fourth embodiment explained in FIGS. 6 and 7, the Z-direction drive 16 was configured by two piezoelectric elements 17 and 18 so as to make the probe 14 (cantilever 15) approach and separate at each of the plurality of sampling positions set in the scan range when measuring an area set to a wide range, but the Z-direction drive for the approach and separate movement is not limited to the above configuration.

The operation for making the probe move in tandem and the operation for reverse movement when the probe explained in the above fourth embodiment approaches to the sample surface may be performed in the first to third embodiments as well. In this case, an auxiliary movement mechanism for tandem movement and reverse movement is provided to the first to third embodiments. The tandem movement and reverse movement auxiliary movement mechanism is provided separately as a mechanism for moving the entire Z-direction drive 16. It is possible to use any device as the auxiliary movement mechanism.

The above embodiments of the present invention relate to measurement at only sampling positions by the approach and separation movement of the probe for the purpose of enabling quick wide measurement by the atomic force microscope etc. and eliminating the effect of force in approach and scan at the sample surface and thereby improving the reproducibility of measurement and relate to approach, separation, and movement of a probe in measurement at sampling positions in a state continuing servo control for the purpose of quick wide measurement by a wide scan by the atomic force microscope etc.

On the other hand, the increasing miniaturization of devices and elements formed on substrates in recent processes for production of semiconductors has led to a need to measure holes (contact holes etc.) and grooves (trenches for element isolation etc.) of a high aspect ratio (5 to 10), so the need arises for measurement of topographic features of the substrate surface using a long, thin probe with a high aspect ratio even in the atomic force microscope etc. In this case as well, with the method of measurement of the atomic force microscope of the related art, problems such as breakage, damage, and tip wear of the high aspect ratio probe occur. As opposed to this, according to the above embodiments of the present invention, even if using a probe with a high aspect ratio, it is possible to prevent breakage, damage, and tip wear of the probe. In this sense, the structure of the scanning probe microscope, method of scanning, and method of measurement according to the present invention explained in the above embodiments are not limited to wide measurement by a wide scan and of course can be also applied to measurement with a usual measurement range.

In the above embodiments, instead of the approach and separation piezoelectric element, it is possible to use a general approach and separation drive, for example, a drive utilizing a motor or a drive utilizing pneumatic or hydraulic power. In such a configuration, it is preferable to add the above-mentioned servo piezoelectric element to the approach and separation drive.

In the above embodiments, an XY scanner for making the sample side move was provided as a movement mechanism, but it is also possible to provide the movement mechanism at the probe side. Further, the explanation was given of the atomic force microscope as an example of the scanning probe microscope, but the present invention can of course also be applied to other types of scanning probe microscopes.

According to the present invention, provision is made of the scanning probe microscope provided with a piezoelectric element for making a position of a probe with respect to a sample surface in the height direction match with a reference distance by a servo control system at a sampling position for measurement and an approach and separation drive for making the probe approach to and separate from the sample surface at the sampling position and separate the probe from the sample surface during movement between sampling positions wherein the probe is made to approach and separate at the sampling positions while continuing the servo control relating to the distance between the sample and probe based on the servo control system, so the effect is exhibited that it is possible to quickly approach and separate the probe without complicated control and possible to shorten the time required for the probe to approach to the sample. Further, by this approach and separation movement, the measurement time can be shortened even if setting a large number of sampling positions. In particular, wide measurement becomes preferable. Further, this configuration is suited to measurement of an object with a high aspect ratio.

For the wide measurement, since provision is made of a movement mechanism able to make the probe scan the wide area of the sample surface, provision is made of a piezoelectric element for causing displacement of the probe to track the sample surface at the time of measurement and a drive for approach of the probe to the sample surface and separation of the probe from the sample surface, and approach, separation, and measurement at the sampling positions in the wide measurement area are enabled, it is possible to measure the topographic information of the sample surface for a wide mm class scan range by a nm class or better resolution. Further, since tandem movement is performed to give a relative speed of the probe with respect to the sample of 0, when the probe approaches to the sample surface at the sampling position for the measurement, it is possible to make a scanning direction parallel component of the force acting on the sample 0, improve the reproducibility of measurement, and further improve the reliability of measurement. Further, since the effects of the frictional force can be eliminated, it is possible to eliminate the wear of the probe, possible to measure over an extremely wide area, reduce the frequency of replacement of the probes, and improve the throughput. Further, since the sample is moved at an equal speed during the scan and does not have to be stopped, it is possible to further improve the throughput.

Further, wide measurement becomes easily possible by just adding a mechanism for approach and separation movement to a conventional ordinary scanning probe microscope.

Further, according to the present invention, in wide measurement by a mm class wide scan of the sample surface in a scanning probe microscope, since a plurality of sampling positions are set as measurement locations, the probe is moved in the state separated from the sample surface during movement between sampling positions, the probe is made to approach for measurement at the sampling positions, and control relating to the distance between the sample and probe by the servo control system is continued during such movement and measurement, wide measurement can be made practical.

Further, since it is possible to approach and separate the probe to and from the sample surface at a sampling position instantaneously utilizing a pulse drive under simple operational control and possible to shorten the time required for the approach movement, the overall measurement time can be shortened.

Further, according to this configuration, it is possible to measure a topographic feature of a sample surface for a wide mm class scan range by a nm class or better resolution, shorten the measurement time, reduce the wear of the probe, and prevent a reduction of the measurement accuracy due to wear of the probe.

Further, according to the present invention, if using a probe with a high aspect ratio even in measurement in an ordinary measurement range, it is possible to prevent breakage, damage, tip wear, etc. of the probe.

While the invention has been described by reference to specific embodiments chosen for purposes of illustration, it should be apparent that numerous modifications could be made thereto by those skilled in the art without departing from the basic concept and scope of the invention.

What is claimed is:

1. A scanning probe microscope comprising:
    a cantilever having a probe close to a sample surface;
    a single piezoelectric element provided with the cantilever for changing a distance between said probe and said sample;
    a displacement detection system for detecting displacement of said probe;
    a servo controller outputting a control signal for controlling the operation of said single piezoelectric element based on a detection signal output by the displacement detection system and a signal relating to a reference distance and holding a distance between said probe and said sample at said reference distance in measurement at a sampling position;
    a scanning piezoelectric element for performing a micrometer-class scanning; and
    a movement mechanism other than a piezoelectric element movement mechanism for performing a millimeter-class wide area scanning;
    wherein said probe scans said surface to measure said surface while holding the distance between said probe and said sample at said reference distance at each of a plurality of said sampling positions, and said probe scans the millimeter class wide area on said surface by said movement mechanism;
    said scanning probe microscope further comprising;
    an approaching and separating supplier for controlling the operation of said single piezoelectric element so as to make said probe approach to the sample surface for measurement at each of said sampling points and then make said probe separate from the sample surface, which outputs a periodic pulse signal for approach and separation;
    wherein said periodic pulse signal from said approaching and separating signal supplier is added to said signal relating to the reference distance produced by said servo controller; and
    wherein the state of the servo control by said servo controller is continued at least when said probe is made to approach the sample surface and during measurement at said sampling points in order to quickly perform wide measurement defined by a millimeter-class scan area.

2. A scanning probe microscope as set forth in claim 1, further comprising a displacement meter for measuring an amount of displacement due to expansion and contraction of said piezoelectric element.

3. A scanning probe microscope comprising:
- a cantilever having a probe close to a sample surface;
- an actuator provided with the cantilever for changing a distance between said probe and said sample;
- a displacement detection system for detecting displacement of said probe; and
- a servo controller outputting a control signal for controlling the operation of said actuator based on a detection signal output by the displacement detection system and a signal relating to a reference distance and holding a distance between said probe and said sample at said reference distance in measurement at a sampling position;
- a scanning piezoelectric element for performing a micrometer-class scanning; and
- a movement mechanism other than a piezoelectric element movement mechanism for performing a millimeter-class wide area scanning;
- wherein said probe scans said surface to measure said surface while holding the distance between said probe and said sample at said reference distance at each of a plurality of said sampling positions, and said probe scans the millimeter class wide area on said surface by said movement mechanism;

said scanning probe microscope further comprising;
- an approaching and separating means for controlling the operation of said actuator so as to make said probe approach to the sample surface for measurement at each of said sampling positions and then make said probe separate from the sample surface; wherein
- said actuator is comprised of a first piezoelectric element for normal measurement and a second piezoelectric element for extension and retraction;
- a signal output from said servo controller is given to said first piezoelectric element;
- a periodic pulse signal for approach and separation is given to said second piezoelectric element; and
- the state of the servo control by said servo controller is continued at least when said probe is made to approach the sample surface and during measurement at said sampling positions in order to quickly perform wide measurement defined by a millimeter-class scan area.

4. A scanning probe microscope as set forth in claim 3, wherein, when said actuator makes said probe approach to the surface of said sample for measurement at said sampling position, said probe moves in tandem at an equal speed in the same direction as the scan motion so that the relative speed of said probe with respect to the sample becomes substantially zero.

5. A scanning probe microscope as set forth in claim 4, wherein:
- said movement mechanism for making said probe scan the sample surface over the millimeter-class scan area;
- when said probe scans said sample by the operation of said movement mechanism and said second piezoelectric element makes said probe extend to the surface of said sample for measurement at said sampling position, said scanning piezoelectric element for performing a micrometer-class scanning makes said probe move in tandem at an equal speed in the same direction as the scan motion by said movement mechanism.

6. A scanning probe microscope as set forth in claim 1, wherein:

said probe has an aspect ratio of more than 5 and said probe measures a surface with the aspect ratio.

7. A method of measurement performed by a scanning probe microscope provided with a cantilever having a probe close to a sample surface, an actuator provided with said cantilever for changing a distance between said probe and said sample, a displacement detection system for detecting displacement of said probe, a servo controller for outputting a control signal for controlling the operation of said actuator and holding a distance between said probe and said sample at said reference distance in measurement at a sampling position based on a detection signal output by the displacement detection system and a signal relating to a reference distance, and a movement mechanism for making said probe scan the sample surface, and said method of scanning said surface by said probe to measure said surface while holding the distance between said probe and said sample at said reference distance at each of a plurality of said sampling positions, said method of measurement further comprising:
- a step of making said probe approach to the said sample and separate from said sample to obtain measurement data at each of said sampling positions while continuing the state of servo control relating to the distance between said probe and said sample by said servo controller at least when said probe is made to approach the sample surface and during measurement at said sampling points in order to quickly perform wide measurement defined by a millimeter-class scan area with other than a piezoelectric element movement mechanism.

8. A method of measurement of a scanning probe microscope as set forth in claim 7, further comprising a step of adding a signal used for said approach and separation to said signal relating to the reference distance in a control loop of said servo controller.

9. A method of measurement of a scanning probe microscope as set forth in claim 7, wherein;
- said actuator is comprised of a first piezoelectric element for normal measurement and a second piezoelectric element for approach and separation;
- a signal output from said servo controller is given to said first piezoelectric element; and
- a periodic pulse signal for approach and separation is given to said second piezoelectric element.

10. A method of measurement of a scanning probe microscope as set forth in claim 7, wherein;
- when said actuator makes said probe approach to the sample surface for measurement at said sampling position, a separately provided auxiliary movement mechanism makes said probe move in tandem at an equal speed in the same direction as the scan motion by said movement mechanism.

11. A method of measurement of a scanning probe microscope as set forth in claim 7, further comprising a step of making said probe scan the sample surface over the millimeter-class scan area.

12. A method of measurement of a scanning probe microscope as set forth in claim 7, wherein;
- a probe with an aspect ratio more than 5 is used as said probe and said probe measures topographic features with the aspect ratio formed on a semiconductor substrate.

13. A scanning probe microscope comprising:
- a probe close to a sample surface; and
- a servo controller for holding a distance between said probe and the surface of said sample at a reference distance during measurement at a sampling position;

wherein said probe scans said surface to measure said surface while holding the distance between said probe and said sample at said reference distance;

said scanning probe microscope further comprising:

a movement mechanism other than a piezoelectric element movement mechanism for making said probe scan the surface of said sample over a millimeter-class scan area;

an approaching and separating means for making said probe approach to the surface of said sample at said sampling position and make said probe separate from the surface of said sample during movement between sampling positions; and an auxiliary micro-class movement mechanism for making said probe move in tandem at an equal speed in the same direction as the scan motion of said movement mechanism when making said probe approach to the surface of said sample for measurement at said sampling position.

14. A scanning probe microscope as set forth in claim 13, wherein said movement mechanism is a sample stage for carrying said sample and making said sample move in the scan direction in millimeter units of length.

15. A method of scanning performed by a scanning probe microscope provided with a probe close to a sample surface and scanning said surface with said probe to measure said surface while holding the distance between said probe and sample at a predetermined distance, said method of scanning being performed for a millimeter-class wide measurement area at the sample surface, a plurality of scattered sampling positions are set in said millimeter-class wide measurement area, and scan motion by a millimeter-class movement mechanism other than a piezoelectric element movement mechanism is performed for measurement at each sampling point, and said method of scanning is comprised of:

a step of making said probe separate from the sample surface during movement between sampling positions, a step of making said probe approach to the surface of said sample for the measurement at each of said sampling positions, and a step of causing scan motion for tandem movement at an equal speed in the same direction as the scan motion of said movement mechanism by an auxiliary micrometer-class movement mechanism when said probe approaches to the sample surface for measurement.

16. A method of scanning of a scanning probe microscope as set forth in claim 15, wherein said scan motion for tandem movement is performed for each sampling position.

17. A method of scanning of a scanning probe microscope as set forth in claim 15, wherein a reverse scan motion is performed each time a said scan motion for tandem movement ends.

18. A scanning probe microscope comprising:

a probe close to a sample surface;

a displacement detection mechanism for detecting displacement of said probe in a height direction with respect to the surface of said sample; and a control circuit for control so as to hold a distance between said sample and said probe at said reference distance based on a detection signal output by said displacement detection mechanism and a signal relating to the reference distance; wherein said probe scans said surface to measure said surface while holding the distance between said probe and said sample at said reference distance, said scanning probe microscope further comprising:

a millimeter-class movement mechanism other than a piezoelectric element movement mechanism for making said probe scan the surface of said sample over a millimeter-class scan area;

a piezoelectric element for making said probe displace in a height direction of said sample with respect to said surface;

a reference distance setting means for giving a voltage signal determining said reference distance;

an approaching and separating signal supplying means for giving a periodic pulse voltage signal for making said probe approach to and separate from the surface of said sample;

a combining means for combining a voltage signal determining said reference distance and said periodic pulse voltage signal; and a subtracting means for calculating a difference between a voltage signal output by said combining means and said detection signal to output a differential signal;

wherein said control circuit generates a control voltage signal based on said differential signal and supplies said voltage signal to said piezoelectric element to control the approach and separation movement.

19. A scanning probe microscope as set forth in claim 18, wherein said probe is made to approach to the surface of said sample at a sampling position for measurement while holding servo control in the height direction in order to quickly perform wide measurement defined by a millimeter-class scan area.

20. A scanning probe microscope comprising:

a probe close to a sample surface;

a displacement detection mechanism for detecting displacement of said probe in a height direction with respect to the surface of said sample;

a control circuit for control so as to hold a distance between said sample and said probe at said reference distance based on a detection signal output by said displacement detection mechanism and a signal relating to the reference distance; and a scanning piezoelectric element for performing a micrometer-class scanning; wherein said probe scans said surface to measure said surface while holding the distance between said probe and said sample at said reference distance;

said scanning probe microscope further comprising:

a millimeter-class movement mechanism other than a piezoelectric element movement mechanism for making said probe scan the surface of said sample over a millimeter-class scan area;

a piezoelectric element for making a position of said probe in a height direction with respect to said sample surface match with said reference distance based on a servo control system at said sampling position; and an approaching and separating means for making said probe approach to the surface of said sample at said sampling position and making said probe separate from the sample surface during movement between sampling positions;

wherein said probe is made to approach and separate to obtain data at said sampling position by said approaching and separating means at each of a plurality of sampling positions while continuing a servo control relating to the distance between said probe and said sample based on said servo control system at least when said probe is made to approach the sample surface and during measurement at said sampling points in order to quickly perform wide measurement defined by a millimeter-class scan area.

21. A scanning probe microscope as set forth in claim 20, wherein said approaching and separating means includes a piezoelectric element.

22. A scanning probe microscope as set forth in claim 18, wherein said movement mechanism is a sample stage for carrying said sample and making said sample move in the scan direction in millimeter units of length.

* * * * *